US012772227B2

(12) United States Patent
Venugopal et al.

(10) Patent No.: US 12,772,227 B2
(45) Date of Patent: Oct. 20, 2026

(54) REPORTING MUTUAL INFORMATION FOR MULTI-BEAM OPERATIONS

(71) Applicant: QUALCOMM Incorporated, San Diego, CA (US)

(72) Inventors: Kiran Venugopal, Green Brook, NJ (US); Yu Zhang, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 18/609,747

(22) Filed: Mar. 19, 2024

(65) Prior Publication Data

US 2025/0301462 A1 Sep. 25, 2025

(51) Int. Cl.

| | |
|---|---|
| ***H04W 72/23*** | (2023.01) |
| ***H04B 7/0408*** | (2017.01) |
| ***H04L 5/00*** | (2006.01) |
| ***H04W 24/08*** | (2009.01) |
| ***H04W 24/10*** | (2009.01) |
| ***H04W 72/044*** | (2023.01) |
| ***H04W 72/20*** | (2023.01) |

(52) U.S. Cl.

CPC ......... *H04W 72/046* (2013.01); *H04L 5/0051* (2013.01); *H04W 24/08* (2013.01); *H04W 24/10* (2013.01); *H04W 72/20* (2023.01)

(58) Field of Classification Search

None

See application file for complete search history.

(56) References Cited

U.S. PATENT DOCUMENTS

| | | | | |
|---|---|---|---|---|
| 10,404,339 | B1 * | 9/2019 | Nammi | H04B 7/0486 |
| 11,343,810 | B2 | 5/2022 | Gao et al. | |
| 2017/0373744 | A1 * | 12/2017 | Fröberg Olsson | H04L 1/0026 |
| 2019/0081672 | A1 * | 3/2019 | Hwang | H04B 7/0413 |
| 2021/0050893 | A1 * | 2/2021 | Park | H04L 5/0048 |

(Continued)

FOREIGN PATENT DOCUMENTS

| | | | |
|---|---|---|---|
| WO | WO-2021042349 | A1 | 3/2021 |
| WO | WO-2023070241 | A1 | 5/2023 |

OTHER PUBLICATIONS

International Search Report and Written Opinion—PCT/US2025/014714—ISA/EPO—May 19, 2025.

*Primary Examiner* — Duc T Duong

(74) *Attorney, Agent, or Firm* — Holland & Hart LLP

(57) ABSTRACT

Methods, systems, and devices for wireless communications are described. The described techniques may enable a user equipment (UE) to account for receive beam correlation while selecting a pair of receive beams. For example, a network entity may configure the UE with multiple channel state information reference signal (CSI-RS) resource configurations. In some examples, the network entity may configure the UE with a report configuration for each of the CSI-RS resource configurations, and may select a CSI-RS resource configuration for the UE to report mutual information (MI). In some examples, the network entity may configure the UE with a single report configuration, and the UE may select a CSI-RS resource configuration to report MI. In some examples, the network entity may configure the UE with two CSI-RS resource configurations, and the UE may report an MI metric for a single CSI-RS resource in each CSI-RS resource configuration.

20 Claims, 20 Drawing Sheets

(56) References Cited

U.S. PATENT DOCUMENTS

| | | | | |
|---|---|---|---|---|
| 2021/0159963 | A1* | 5/2021 | Akkarakaran | H04L 1/1607 |
| 2021/0352503 | A1* | 11/2021 | Zhou | H04W 16/28 |
| 2021/0392632 | A1* | 12/2021 | Venugopal | H04W 72/02 |
| 2022/0225337 | A1* | 7/2022 | Fan | H04W 24/10 |
| 2024/0031102 | A1* | 1/2024 | Li | H04L 5/0092 |
| 2024/0146372 | A1* | 5/2024 | Liu | H04L 5/0048 |
| 2024/0187077 | A1* | 6/2024 | Karjalainen | H04B 7/06952 |
| 2024/0214158 | A1* | 6/2024 | Wang | H04W 72/0446 |
| 2026/0075449 | A1* | 3/2026 | Li | H04B 7/0626 |
| 2026/0129647 | A1* | 5/2026 | Zhu | H04W 72/21 |

* cited by examiner

REPORTING MUTUAL INFORMATION FOR MULTI-BEAM OPERATIONS

FIELD OF TECHNOLOGY

The following relates to wireless communications, including reporting mutual information (MI) for multi-beam operations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support reporting mutual information (MI) for multi-beam operations. For example, the described techniques may enable a user equipment (UE) to account for receive beam correlation while selecting the first receive beam and the second receive beam. For example, a network entity may configure the UE with multiple channel state information reference signal (CSI-RS) resource configurations. The network entity may configure the UE to report a MI metric for one or more of the CSI-RS resource configurations. In some examples, the network entity may configure the UE with a report configuration for each of the CSI-RS resource configurations, and may select a CSI-RS resource configuration (e.g., a pair of transmit beams) for the UE to report MI. In some examples, the network entity may configure the UE with a single report configuration, and the UE may select a CSI-RS resource configuration to report MI (e.g., a CSI-RS resource configuration with a highest MI). In some examples, the network entity may configure the UE with two CSI-RS resource configurations (e.g., each including a plurality of transmit beams), and the UE may report an MI metric for a single CSI-RS resource in each CSI-RS resource configuration (e.g., a transmit beam from each CSI-RS resource configuration). Additionally, or alternatively, the UE may report a reference signal received power (RSRP) (e.g., determined by performing a weighted sum of RSRPs using one or more wideband coefficients).

A method for wireless communications by a user equipment (UE) is described. The method may include receiving control signaling indicating a set of multiple resource set configurations and at least one reporting configuration, the control signaling indicating that repetition is enabled for at least a first beam for a first resource set and a second beam for a second resource set, the control signaling further requesting for the UE to report a first MI metric associated with the first beam and the second beam, monitoring for a first reference signal transmission via the first beam in accordance with a first resource set configuration of the set of multiple resource set configurations, monitoring for a second reference signal transmission via the second beam in accordance with the first resource set configuration or a second resource set configuration of the set of multiple resource set configurations, and transmitting, in accordance with the at least one reporting configuration, a measurement report indicating the first MI metric, the first MI metric based on at least one of a measurement associated with the first reference signal transmission or a measurement associated with the second reference signal transmission.

A UE for wireless communications is described. The UE may include one or more memories storing processor executable code, and one or more processors coupled with the one or more memories. The one or more processors may individually or collectively be operable to execute the code to cause the UE to receive control signaling indicating a set of multiple resource set configurations and at least one reporting configuration, the control signaling indicating that repetition is enabled for at least a first beam for a first resource set and a second beam for a second resource set, the control signaling further requesting for the UE to report a first MI metric associated with the first beam and the second beam, monitor for a first reference signal transmission via the first beam in accordance with a first resource set configuration of the set of multiple resource set configurations, monitor for a second reference signal transmission via the second beam in accordance with the first resource set configuration or a second resource set configuration of the set of multiple resource set configurations, and transmit, in accordance with the at least one reporting configuration, a measurement report indicating the first MI metric, the first MI metric based on at least one of a measurement associated with the first reference signal transmission or a measurement associated with the second reference signal transmission.

Another UE for wireless communications is described. The UE may include means for receiving control signaling indicating a set of multiple resource set configurations and at least one reporting configuration, the control signaling indicating that repetition is enabled for at least a first beam for a first resource set and a second beam for a second resource set, the control signaling further requesting for the UE to report a first MI metric associated with the first beam and the second beam, means for monitoring for a first reference signal transmission via the first beam in accordance with a first resource set configuration of the set of multiple resource set configurations, means for monitoring for a second reference signal transmission via the second beam in accordance with the first resource set configuration or a second resource set configuration of the set of multiple resource set configurations, and means for transmitting, in accordance with the at least one reporting configuration, a measurement report indicating the first MI metric, the first MI metric based on at least one of a measurement associated with the first reference signal transmission or a measurement associated with the second reference signal transmission.

A non-transitory computer-readable medium storing code for wireless communications is described. The code may include instructions executable by one or more processors to receive control signaling indicating a set of multiple resource set configurations and at least one reporting configuration, the control signaling indicating that repetition is enabled for at least a first beam for a first resource set and a second beam for a second resource set, the control signaling further requesting for the UE to report a first MI metric associated with the first beam and the second beam, monitor for a first reference signal transmission via the first beam in accordance with a first resource set configuration of the set of multiple resource set configurations, monitor for a second reference signal transmission via the second beam in accordance with the first resource set configuration or a second resource set configuration of the set of multiple resource set configurations, and transmit, in accordance with the at least one reporting configuration, a measurement report indicating the first MI metric, the first MI metric based on at least one of a measurement associated with the first reference signal transmission or a measurement associated with the second reference signal transmission.

Some examples of the method, UEs, and non-transitory computer-readable medium described herein may further include operations, features, means, or instructions for receiving a request indicating for the UE to transmit the measurement report, where the request indicates a reporting configuration identification of the at least one reporting configuration.

In some examples of the method, UEs, and non-transitory computer-readable medium described herein, the at least one reporting configuration may be a set of multiple reporting configurations, each of the set of multiple resource set configurations corresponds to a respective reporting configuration of the set of multiple reporting configurations, and the request for the UE to transmit the measurement report indicates to use a first reporting configuration of the set of multiple reporting configurations.

In some examples of the method, UEs, and non-transitory computer-readable medium described herein, transmitting the measurement report may include operations, features, means, or instructions for transmitting the measurement report that indicates a first resource set configuration of the set of multiple resource set configurations, the first resource set configuration associated with a preferred beam pair of a set of multiple beam pairs associated with the set of multiple resource set configurations, the preferred beam pair based on the first MI metric or one or more additional MI metrics.

In some examples of the method, UEs, and non-transitory computer-readable medium described herein, transmitting the measurement report may include operations, features, means, or instructions for transmitting the measurement report that indicates the first MI metric associated with the first resource configuration and that indicates a second MI metric associated with the second resource configuration.

In some examples of the method, UEs, and non-transitory computer-readable medium described herein, the measurement report further indicates a reference signal received power, the reference signal received power based on one or more wideband coefficients associated with the first beam, the second beam, or both.

Some examples of the method, UEs, and non-transitory computer-readable medium described herein may further include operations, features, means, or instructions for receiving control signaling indicating a set of multiple predefined wideband coefficient values for the UE to select from when reporting at least one wideband coefficient associated with the first beam, the second beam, or both, where one or more wideband coefficients indicated in the measurement report include at least a first predefined wideband coefficient value from the set of multiple predefined wideband coefficient values.

Some examples of the method, UEs, and non-transitory computer-readable medium described herein may further include operations, features, means, or instructions for receiving control signaling indicating for the UE to report the one or more wideband coefficients.

Some examples of the method, UEs, and non-transitory computer-readable medium described herein may further include operations, features, means, or instructions for transmitting a second measurement report indicating one or more channel state information parameters, the one or more channel state information parameters including a channel quality indicator, a precoding matrix indicator, a rank indicator, or any combination thereof, associated with the first beam and the second beam.

Some examples of the method, UEs, and non-transitory computer-readable medium described herein may further include operations, features, means, or instructions for receiving second control signaling indicating a CSI-RS resource set based on the measurement report, receiving one or more CSI-RSs via a resource of the CSI-RS resource set, and transmitting a CSI-RS report indicating a channel measurement, a channel quality indicator, a precoding matrix indicator, or any combination thereof.

In some examples of the method, UEs, and non-transitory computer-readable medium described herein, the first resource set configuration indicates that beam repetition may be enabled for transmissions via the first beam for the first resource set, and via the second beam for the second resource set.

In some examples of the method, UEs, and non-transitory computer-readable medium described herein, the first resource set configuration indicates that beam repetition may be enabled for transmissions via the first beam for the first resource set and the second resource set configuration indicates that beam repetition may be enabled for transmissions via the second beam for the second resource set.

In some examples of the method, UEs, and non-transitory computer-readable medium described herein, monitoring for the second reference signal transmission may include operations, features, means, or instructions for monitoring for the second reference signal transmission via the second beam in accordance with the first resource set configuration.

In some examples of the method, UEs, and non-transitory computer-readable medium described herein, monitoring for the second reference signal transmission may include operations, features, means, or instructions for monitoring for the second reference signal transmission via the second beam in accordance with the second resource set configuration.

A method for wireless communications by a network entity is described. The method may include outputting control signaling indicating a set of multiple resource set configurations and at least one reporting configuration, the control signaling indicating that repetition is enabled for at least a first beam of a first resource set and a second beam of a second resource set, the control signaling further requesting for a UE to report a first MI metric associated with the first beam and the second beam, outputting a first reference signal transmission via the first beam in accordance with a first resource set configuration of the set of multiple resource set configurations, outputting a second reference signal transmission via the second beam in accordance with the first resource set configuration or a second resource set configuration of the set of multiple resource set configurations, and obtaining, in accordance with the at least one reporting configuration, a measurement report indicating the first MI metric, the first MI metric based on at least one of a measurement associated with the first reference signal transmission or a measurement associated with the second reference signal transmission.

A network entity for wireless communications is described. The network entity may include one or more memories storing processor executable code, and one or more processors coupled with the one or more memories. The one or more processors may individually or collectively be operable to execute the code to cause the network entity to output control signaling indicating a set of multiple resource set configurations and at least one reporting configuration, the control signaling indicating that repetition is enabled for at least a first beam of a first resource set and a second beam of a second resource set, the control signaling further requesting for a UE to report a first MI metric associated with the first beam and the second beam, output a first reference signal transmission via the first beam in accordance with a first resource set configuration of the set of multiple resource set configurations, output a second reference signal transmission via the second beam in accordance with the first resource set configuration or a second resource set configuration of the set of multiple resource set configurations, and obtain, in accordance with the at least one reporting configuration, a measurement report indicating the first MI metric, the first MI metric based on at least one of a measurement associated with the first reference signal transmission or a measurement associated with the second reference signal transmission.

Another network entity for wireless communications is described. The network entity may include means for outputting control signaling indicating a set of multiple resource set configurations and at least one reporting configuration, the control signaling indicating that repetition is enabled for at least a first beam of a first resource set and a second beam of a second resource set, the control signaling further requesting for a UE to report a first MI metric associated with the first beam and the second beam, means for outputting a first reference signal transmission via the first beam in accordance with a first resource set configuration of the set of multiple resource set configurations, means for outputting a second reference signal transmission via the second beam in accordance with the first resource set configuration or a second resource set configuration of the set of multiple resource set configurations, and means for obtaining, in accordance with the at least one reporting configuration, a measurement report indicating the first MI metric, the first MI metric based on at least one of a measurement associated with the first reference signal transmission or a measurement associated with the second reference signal transmission.

A non-transitory computer-readable medium storing code for wireless communications is described. The code may include instructions executable by one or more processors to output control signaling indicating a set of multiple resource set configurations and at least one reporting configuration, the control signaling indicating that repetition is enabled for at least a first beam of a first resource set and a second beam of a second resource set, the control signaling further requesting for a UE to report a first MI metric associated with the first beam and the second beam, output a first reference signal transmission via the first beam in accordance with a first resource set configuration of the set of multiple resource set configurations, output a second reference signal transmission via the second beam in accordance with the first resource set configuration or a second resource set configuration of the set of multiple resource set configurations, and obtain, in accordance with the at least one reporting configuration, a measurement report indicating the first MI metric, the first MI metric based on at least one of a measurement associated with the first reference signal transmission or a measurement associated with the second reference signal transmission.

Some examples of the method, network entities, and non-transitory computer-readable medium described herein may further include operations, features, means, or instructions for outputting a request indicating for the UE to transmit the measurement report, where the request indicates a reporting configuration identification associated with one of the at least one reporting configuration.

In some examples of the method, network entities, and non-transitory computer-readable medium described herein, the at least one reporting configuration may be a set of multiple reporting configurations, each of the set of multiple resource set configurations corresponds to a respective reporting configuration of the at least one reporting configuration, and the request for the UE to transmit the measurement report indicates a reporting configuration identification associated with one of the at least one reporting configuration.

In some examples of the method, network entities, and non-transitory computer-readable medium described herein, obtaining the measurement report may include operations, features, means, or instructions for obtaining the measurement report that indicates a first resource set configuration of the set of multiple resource set configurations, the first resource set configuration associated with a preferred beam pair of a set of multiple beam pairs associated with the set of multiple resource set configurations, the preferred beam pair based on the first MI metric or one or more additional MI metrics.

In some examples of the method, network entities, and non-transitory computer-readable medium described herein, obtaining the measurement report may include operations, features, means, or instructions for obtaining the measurement report that indicates the first MI metric associated with the first resource configuration and that indicates a second MI metric associated with the second resource configuration.

In some examples of the method, network entities, and non-transitory computer-readable medium described herein, the measurement report further indicates a reference signal received power, the reference signal received power based on one or more wideband coefficients associated with the first beam, the second beam, or both.

Some examples of the method, network entities, and non-transitory computer-readable medium described herein may further include operations, features, means, or instructions for outputting control signaling indicating a set of multiple predefined wideband coefficient values for the UE to select from when reporting at least one wideband coefficient associated with the first beam, the second beam, or both, where one or more wideband coefficients indicated in the measurement report include at least a first predefined wideband coefficient value from the set of multiple predefined wideband coefficient values.

Some examples of the method, network entities, and non-transitory computer-readable medium described herein may further include operations, features, means, or instructions for outputting second control signaling indicating a CSI-RS resource set based on the measurement report, outputting one or more CSI-RSs via a resource of the CSI-RS resource set, and obtaining a CSI-RS report indicating a channel measurement, a channel quality indicator, a precoding matrix indicator, or any combination thereof.

In some examples of the method, network entities, and non-transitory computer-readable medium described herein, the first resource set configuration indicates that beam repetition may be enabled for transmissions via the first beam for the first resource set and via the second beam for the second resource set.

In some examples of the method, network entities, and non-transitory computer-readable medium described herein, the first resource set configuration indicates that beam repetition may be enabled for transmissions via the first beam for the first resource set, and the second resource set configuration indicates that beam repetition may be enabled for transmissions via the second beam for the second resource set.

DETAILED DESCRIPTION

Figure 1:
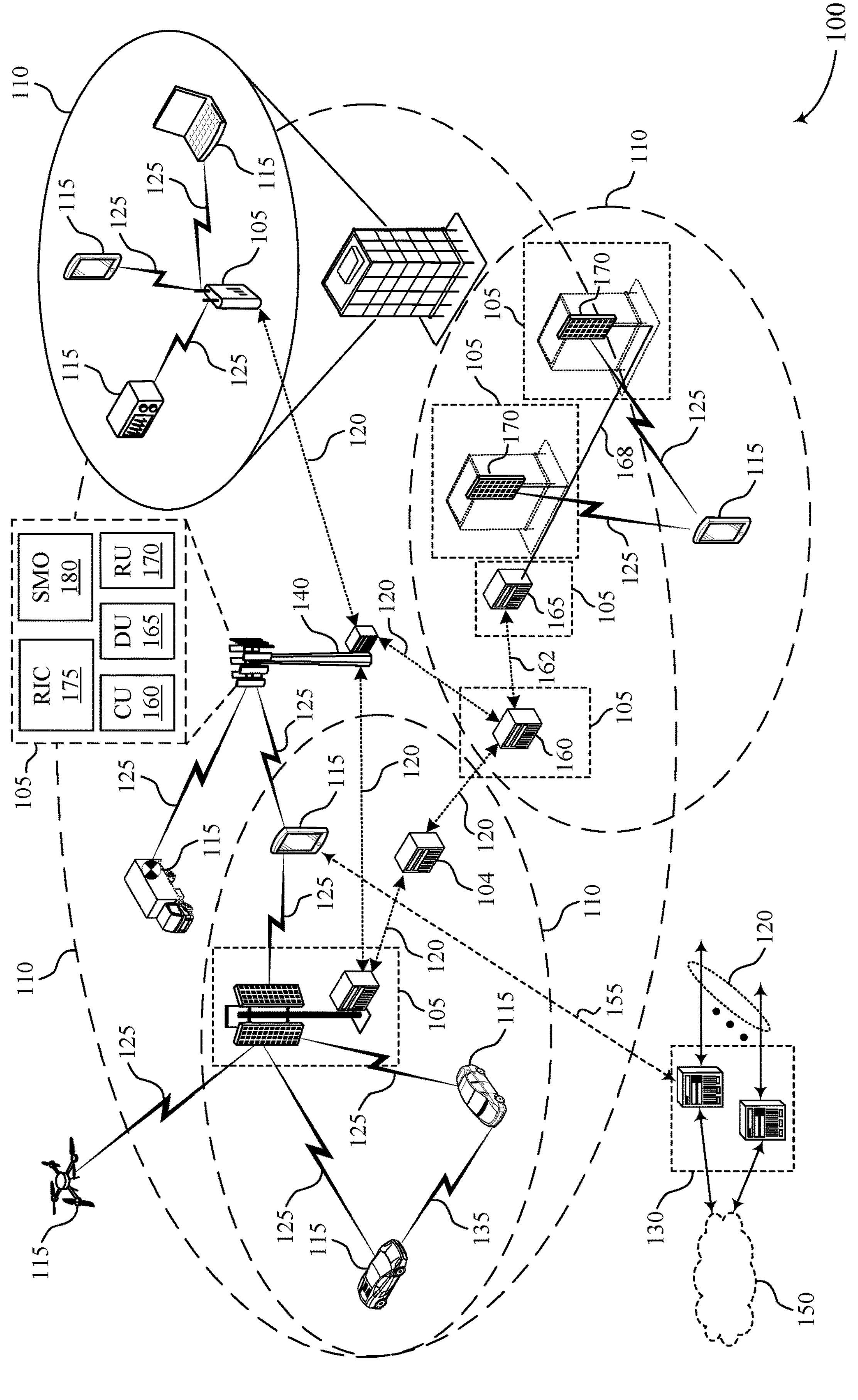
FIG. 1 shows an example of a wireless communications system that supports reporting mutual information (MI) for multi-beam operations in accordance with one or more aspects of the present disclosure.

In some wireless communications systems, a user equipment (UE) may perform a beam management procedure to select one or more pairs of transmit and receive beams for the UE to use in communications with a network entity. For example, the UE may report a reference signal received power (RSRP) or a signal to noise plus interference ratio (SNIR) associated with channel state information reference signal (CSI-RSs) received via the transmit and receive beams. In some examples, the UE may use multiple cross-polarized antenna panels to achieve a higher rank of communications (e.g., for single user (SU) multiple-input-multiple-output (MIMO) communications), and an achievable rank of the SU-MIMO communications may depend on a correlation between a first receive beam and a second receive beam selected by the UE (e.g., during the beam management procedure). However, some beam management procedures may not account for correlations between the first receive beam and the second receive beam, which may result in a relatively lower achievable rank as compared to less correlated receive beams.

Accordingly, techniques described herein may allow for the UE to account for receive beam correlation while selecting the first receive beam and the second receive beam. For example, the network entity may configure the UE with multiple CSI-RS resource configurations (e.g., a configuration indicating that repetition is enabled such that the network entity transmits via each transmit beam multiple times, indicating one or more resources via which the network entity may transmit CSI-RSs, indicating a quantity of CSI-RSs that the network entity may transmit via each beam, and so on). The network entity may configure the UE to report a mutual information (MI) metric (e.g., a metric accounting for beam quality, correlation, and the like) for one or more combinations of transmit beam pairs and receive beam pairs. The MI metric reported by the UE may account for both of a quality of each of the transmit beams and receive beams, and a correlation between the receive beam pairs. Accordingly, beams selected via an MI-based beam management procedure may account for correlation between receive beams, which may result in a relatively higher achievable rank as compared to some other beam management procedures.

In some examples, the network entity may configure the UE with a report configuration for each of the CSI-RS resource configurations, and may select a CSI-RS resource configuration (e.g., a pair of transmit beams) for the UE to report MI. In some examples, the network entity may configure the UE with a single report configuration, and the UE may select a CSI-RS resource configuration to report MI (e.g., a CSI-RS resource configuration with a highest MI). In some examples, the network entity may configure the UE with two CSI-RS resource configurations (e.g., each including a plurality of transmit beams), and the UE may report an MI metric for a single CSI-RS resource in each CSI-RS resource configuration (e.g., a transmit beam from each CSI-RS resource configuration). Additionally, or alternatively, the UE may report an RSRP (e.g., determined by performing a weighted sum of RSRPs using one or more wideband coefficients).

Aspects of the disclosure are initially described in the context of wireless communications systems. Aspects of the disclosure are further illustrated by and described with reference to signaling diagrams, process flow diagrams, apparatus diagrams, system diagrams, and flowcharts that relate to reporting MI for multi-beam operations.

FIG. 1 shows an example of a wireless communications system 100 that supports reporting MI for multi-beam operations in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support reporting MI for multi-beam operations as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, MIMO communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In accordance with techniques described herein, a UE 115 may account for receive beam correlation while selecting the first receive beam and the second receive beam. For example, a network entity 105 may configure the UE 115 with multiple CSI-RS resource configurations (e.g., with repetition enabled such that the network entity transmits via each transmit beam multiple times). The network entity 105 may configure the UE 115 to report a MI metric (e.g., a metric accounting for beam quality and correlation) for one or more of the CSI-RS resource configurations.

In some examples, the network entity 105 may configure the UE 115 with a report configuration for each of the CSI-RS resource configurations, and may select a CSI-RS resource configuration (e.g., a pair of transmit beams) for the UE 115 to report MI. In some examples, the network entity 105 may configure the UE 115 with a single report configuration, and the UE 115 may select a CSI-RS resource configuration to report MI (e.g., a CSI-RS resource configuration with a highest MI). In some examples, the network entity 105 may configure the UE 115 with two CSI-RS resource configurations (e.g., each including a plurality of transmit beams). The UE 115 may report an MI metric for a single CSI-RS resource in each CSI-RS resource configuration (e.g., a transmit beam from each CSI-RS resource configuration). Additionally, or alternatively, the UE 115 may report an RSRP associated with one or more beams (e.g., determined by performing a weighted sum of RSRPs using one or more wideband coefficients).

Figure 2:
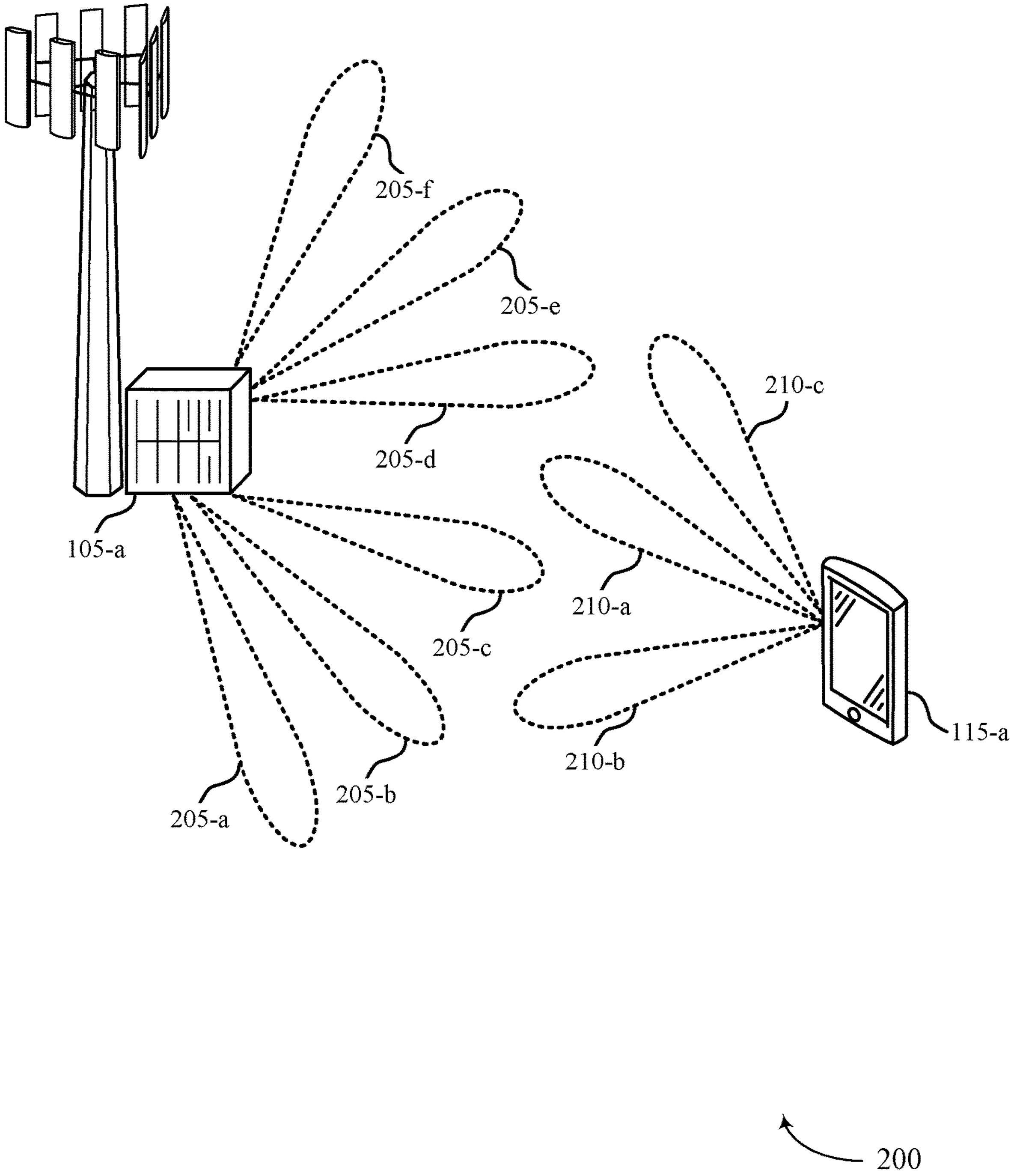
FIG. 2 shows an example of a wireless communications system that supports reporting MI for multi-beam operations in accordance with one or more aspects of the present disclosure.

FIG. 2 shows an example of a wireless communications system 200 that supports reporting MI for multi-beam operations in accordance with one or more aspects of the present disclosure. The wireless communications system 200 may implement or may be implemented by aspects of the wireless communications system 100. For example, the wireless communications system 200 may include a UE 115 (e.g., a UE 115-*a*) and a network entity 105 (e.g., a network entity 105-*a*), which may be examples of the corresponding devices as described with reference to FIG. 1.

In some examples of the wireless communications system 200, a UE 115-*a* may communicate with a network entity 105-*a* via one or more beams. For example, the network entity 105-*a* may transmit one or more messages to the UE 115-*a* via one or more transmit beams 205 (e.g., a transmit beam 205-*a* through a transmit beam 205-*f*), and the UE 115-*a* may receive the one or more messages via one or more receive beams (e.g., a receive beam 210-*a*, a receive beam 210-*b*, and a receive beam 210-*c*). In some examples, to support higher rank (e.g., larger than rank 2) SU-MIMO operations, the UE 115-*a* and the network entity 105-*a* may have more than one cross-polarized (e.g., x-pol) antenna panels. That is, each cross-polarized panel may support up to rank-2 MIMO communications (e.g., via two ports), and therefore the UE 115-*a* and the network entity 105-*a* may use multiple cross-polarized panels to support rank-3 or above communications. Additionally, some frequency bands (e.g., FR2) may rely on analog beamforming to counter pathloss, and therefore multiple cross-polarized antenna panels may be used in such frequency bands.

In some examples, the UE 115-*a* may select receive beams 210 for each of the cross-polarized antenna panels to support larger than rank 2 MIMO communications (e.g., two receive beams). For example, if the UE 115-*a* uses a same receive beam 210 (e.g., or similar or correlated receive beam 210) at each cross-polarized panel, a beamformed channel between the UE 115-*a* and the network entity 105-*a* may have a low rank condition (e.g., rank 2 or less).

To select receive beams 210 (e.g., and transmit beams 205), the UE 115-*a* may perform a beam management procedure followed by a CSI acquisition procedure. For example, the UE 115-*a* may use beam management to address a receiving SNR (e.g., prioritized above CSI framework). However, the beam management procedure may restrict the MIMO channel into a subspace (e.g., a dominant subspace) in an available dimension. That is, the beam management procedure may reduce a quantity of beams that the UE 115-*a* may select. The UE 115-*a* and the network entity 105-*a* may therefore select each transmit beam 205 and receive beam 210 of a transmit beam pair and a receive beam pair individually (e.g., based on an RSRP or a signal-to-noise-plus-interference ratio (SINR)), and may not account for achievable rank in beam selection. That is, beam management followed by CSI acquisition may not be support high rank (e.g., greater than rank-2) SU-MIMO.

To perform the beam management procedure followed by the CSI acquisition procedure, the network entity 105-*a* may configure the UE 115-*a* to feedback multiple CSI resource indicators (CRIs) or synchronization signal block resource indicators (SSBRI) and to transmit an associated L1 report quantity for each CRI or SSBRI (e.g., in a single report). Each CRI or SSBRI may refer to a reference signal resource transmitted by the network entity 105-*a* with a distinct transmit beam. Each CSI or SSBRI may further be associated with a quasi co-located (QCL) receive beam 210 reference (e.g., with QCL type D). The associated L1 report quantity for each CRI or SSBRI may include an RSRP or an SNIR associated with each CRI or SSBRI (e.g., associated with each transmit beam 205).

In some examples, the network entity 105-*a* may indicate a quantity of reference signals for the UE 115-*a* to report (e.g., by setting parameter value nrofReportedRS grater than 1), and may disable a group-based beam reporting (e.g., with parameter groupBasedBeamReporting set to 'disabled') via an RRC configuration. The UE 115-*a* may therefore report nofReportedRS CRIs or SSBRIs (e.g., in a single report to the network entity 105-*a*). In some examples, the network entity may enable the group-based beam reporting (e.g., with parameter groupBasedBeamReporting set to 'enabled') via the RRC configuration. In such examples, the UE 115-*a* may report a quantity nofReportedGroups (e.g., an RRC configured quantity) of two CRIs or SSBRIs. For example, the UE 115-*a* may select one resource from each of two configured resource sets from which the UE 115-*a* may receive resources of each group simultaneously. Such group-based beam reporting may apply for SU-MIMO frequency division multiplexing (FDM) or spatial division multiplexing (SDM), as the UE 115-*a* may report resources that the UE 115-*a* may use simultaneously.

In some examples, the L1 report quantity may include an RSRP or an SINR. For example, for RSRP-based beam selection, the UE 115-*a* may select two distinct transmit beams 205 that may individually have a highest RSRP (e.g., among the transmit beams 205-*a* through 205-*f*). However, RSRP-based beam selection may not account for correlation between the selected beams. For SINR-based beam selection, the UE 115-*a* may select two transmit beams 205 that may individually have a highest SINR (e.g., among the transmit beams 205-*a* through 205-*f*). However, SINR-based beam selection may not incorporate an interaction (e.g., interference) between the selected beams. For example, the UE 115-*a* may select a transmit beam 205-*b* and a transmit beam 205-*c* and may individually compute an SINR associated with each of the transmit beam 205-*b* and the transmit beam 205-*c* with respect to a respective (e.g., pre-configured) interference measurement resource (IMR), but may not compute an SINR of each beam resulting from the other beam.

Based on the beam management procedure (e.g., the reported RSRP or SINR), the network entity 105-*a* may configure a new CSI-RS resource (e.g., with multiple antenna ports and transmit beams 205). The network entity 105-*a* may request for CSI feedback from the UE 115-*a* based on the configured CSI-RS resources. The UE 115-*a* may accordingly transmit a CSI report (e.g., including rank indicator (RI), layer indicator (LI), precoder matrix index (PMI), and channel quality index (CQI) via a cri-RI-LI-PMI-CQI report, or one or more other report quantities) conditioned on a CRI. That is, the CSI report may include one or more report quantities associated with one or more transmit beams 205. In some examples, a CRI used for CSI reporting may include a relatively larger quantity of antenna ports than a CRI used for beam management (e.g., greater than one or two ports).

In some cases, the beam management and CSI-based beam selection procedure may not allow for higher rank (e.g., larger than rank-2) SU-MIMO. For example, the UE 115-*a* may not select beams via the beam management procedure based on how correlated the beams are or based on rank condition (e.g., a rank achievable with the selected beams). Thus, the UE 115-*a* may not identify a rank deficiency associated with the selected beams until performing CSI acquisition. That is, the UE 115-*a* may determine that an achievable rank with the selected beams is less than a target achievable rank (e.g., greater than rank-2) during CSI acquisition, and the UE 115-*a* may restart the beam selection procedure to select less correlated beams.

Accordingly, techniques described herein may enable the UE 115-*a* to jointly perform beam management and CSI indication during L1 reporting. For example, based on L1 measurements from multiple individual resources or transmit beams 205, the UE 115-*a* may determine a preferred combination of beams. For example, the UE 115-*a* may measure a post-beamforming channel as $w_i^* H_{i,j} f_j \in \mathbb{C}^{2\times 2}$ for a wireless communications system with two x-pol panels at each of the UE 115-*a* and the network entity 105-*a* (e.g., with a transmit beam $f_j$ from transmit panel j and a receive beam $w_i$ at receive panel i). As an illustrative example, an effective rank-4 MIMO channel $H_{eff}$ may be observed by the UE 115-*a* according to a matrix, as illustrated in Equation 1.

$$H_{eff} = W_{RF}^* H F_{RF} = \begin{bmatrix} w_1^* H_{1,1} f_1 & w_1^* H_{1,2} f_2 \\ w_2^* H_{2,1} f_1 & w_2^* H_{2,2} f_2 \end{bmatrix} \quad (1)$$

As described with reference to Equation 1, $w_1$ and $w_2$ may be a first receive beam 210 and a second receive beam 210 (e.g., the receive beam 210-*a* and the receive beam 210-*b*, respectively). $f_1$ and $f_2$ may be a first transmit beam 205 and a second transmit beam 205 (e.g., a transmit beam 205-*d* and a transmit beam 205-*e*, respectively). $H_{i,j}$ may be the physical channel observed using receive beam $w_i$ and transmit beam $f_j$. In some examples, $H_{i,j}$ may be referred to as a pre-beamforming channel.

In some aspects, the UE 115-*a* may select $f_1$ and $f_2$ based on singular value decomposition (SVD) of the effective MIMO channel $H_{eff}$ based on individual measurements $w_1 H_{i,j} f_j$. The SVD of the effective MIMO channel may allow the UE 115-*a* to determine an effective rank of the MIMO channel. In some examples, the UE 115-*a* may receive $f_1$ and $f_2$ simultaneously (e.g., as for group-based reporting). The UE 115-*a* may jointly select $f_1$ and $f_2$ as well as $w_1$ and $w_2$ to result in a highest overall performance (e.g., according to an RSRP, SINR, CQI, PMI, an achievable rank, and so on associated with $f_1$, $f_2$, $w_i$, and $w_2$) of each combination of transmit beams 205 and receive beams 210.

In some aspects, the UE 115-*a* may identify a reporting metric (e.g., a rule for reporting) to identify a combination of transmit beams 205 and receive beams 210 that result in a higher channel quality (e.g., based on SINR, RSRP, and so on) and that are relatively less correlated than some other pairs of beams (e.g., to result in a higher achievable rank of SU-MIMO communications). That is, to determine the preferred combination of both transmit beams 205 and receive beams 210, the UE 115-*a* may report a new report quantity MI, which may be defined according to Equation 2.

$$MI = \log_2 \det\left(I + \frac{SNR}{N_s} H_{eff} H_{eff}^*\right) \quad (2)$$

As described with reference to Equation 2, the SNR may be a SNR value assumption indicated in a reporting configuration or according to a defined rule, I may be the identity matrix, and $N_S$ may be an achievable rank assumption indicated in the reporting configuration or according to a defined rule. A pair of transmit beams 205 and a pair of receive beams 210 that result in a higher MI metric may be less correlated and therefore associated with a higher achievable rank than a pair of transmit beams 205 and a pair of receive beams 210 that result in a lower MI metric. The UE 115-*a* may indicate the new reporting metric MI to the network entity 105-*a*, and the network entity 105-*a* may use the new reporting metric for further CSI reporting.

To correctly characterize off-diagonal terms of the effective channel matrix $H_{eff}$, the UE 115-*a* may use a same receive beam 210 for each transmit beam 205. That is, each row of the effective channel matrix $H_{eff}$ may be associated with a same receive beam 210, and each column of the effective channel matrix $H_{eff}$ may be associated with a same transmit beam. Thus, a configuration for receiving the reference signals may instruct the UE 115-*a* to use a same receive beam 210 (e.g., similar to configuration and UE behavior when SINR is a configured reporting metric).

To select $w_i$ and $w_2$, the UE 115-*a* may measure the effective channel from each transmit beam 205 with each receive beam 210. Accordingly, the network entity 105-*a* may transmit reference signals via each transmit beam 205 multiple times. That is, repetition may be set to 'on' in a CSI-RS resource set configuration. In a CSI-RS resource set with repetition set to 'on,' the network entity 105-*a* may transmit via resources with a same transmit beam 205 in different OFDM symbols. In some cases, the UE 115-*a* may not report CRI when repetition is set to 'on' for a CSI-RS resource set. Repetition may be enabled if a report quantity is set to RSRP, SINR, or 'none.' In some examples, if the UE 115-*a* is configured with a report quantity set to RSRP or SINR and a measurement resource has repetition is set to 'on', the UE 115-*a* may be configured with a same quantity of ports (e.g., one or two ports) for each CSI-RS resource with a resource set (e.g., configured by parameter nrofPorts).

To facilitate the UE 115-*a* to report MI, the network entity 105-*a* may configure a new report quantity consisting of multiple CRIs, MI, one or more wideband coefficient values set based on reported CRIs, and an RSRP value (e.g., a single RSRP value) based on the wideband coefficients for the reported CRIs. The report may be applicable to multiple CSI-RS resources or resource sets that are configured as measurement resources in a report setting. The UE 115-*a* may calculate MI based on an SNR reference assumption, MIMO rank, and/or the one or more wideband coefficient values with SVD decomposition values of the effective channel (e.g., optimal or preferred SVD precoding). In some examples, the UE 115-*a* may not determine MI based on any PMI or RI assumption (e.g., unlike wideband CQI). In some examples, if the network entity 105-*a* configures the UE 115-*a* with three or more CRIs in a same report configuration, the UE 115-*a* may report CRIs and/or IDs relating to CSI resources. The UE 115-*a* may transmit a report to the network entity 105-*a* based on the configuration (e.g., indicating the MI metric, an RSRP value, and/or one or more wideband coefficients).

The UE 115-*a* may compute an $RSRP_i$ as $|w_i^* H_{i,j} f_i|^2$ averaged over a quantity of receive ports (e.g., one or two receive ports) and a bandwidth used to receive the reference signals. The one or more wideband coefficients may be one or more weights describing how the network entity 105-*a* may scale each transmit beam 205. For example, $\alpha_j$ may describe a proportion of transmit power that the network entity 105-*a* may use for transmit beam $f_j$. That is, the network entity 105-*a* may apply the wideband coefficients to scale the power of each transmit beam 205 by a respective value a, which may allow the UE 115-*a* to select higher quality transmit beams 205 in an eigen-domain (e.g., based on water-filling techniques). In some examples, the one or more wideband coefficients may be of the form $\alpha_i$ such that $\Sigma_i \alpha_i = c$. Accordingly, the reported RSRP may be conditioned on the wideband coefficients. That is, the UE 115-*a* may calculate the RSRP as a weighted sum of RSRP measurements $\Sigma_i \alpha_i RSRP_i$.

An MI metric computed using the wideband coefficients may be relatively more accurate than an MI metric computed without the wideband coefficients (e.g., due to accounting for beam scaling). The UE 115-*a* may accordingly instead calculate the MI using the wideband coefficients according to Equation 3.

$$MI_a = \log_2 \det(I + SNR * \text{diag}(\{\alpha_i\}) H_{eff} H_{eff}^*) \quad (3)$$

In some examples, the network entity 105-*a* may configure the UE 115-*a* with the one or more wideband coefficients (e.g., to reduce computations at the UE 115-*a*). For example, the network entity 105-*a* may transmit an indication of a finite set k of values $p_i$ applicable for the wideband coefficients. As an illustrative example, the network entity 105-*a* may configure the UE 115-*a* with a table of coefficient values such as Table 1.

TABLE 1

| $k_i$ | $p_i$ |
|---|---|
| 0 | 0 |
| 1 | 1/64 |
| 2 | 1/32 |
| 3 | 1/16 |
| 4 | 1/8 |
| 5 | 1/4 |
| 6 | 1/2 |
| 7 | 1 |

In some examples, the network entity 105-*a* may indicate to the UE 115-*a* whether to report the wideband coefficients in the report. The UE 115-*a* may therefore transmit the report with or without the wideband coefficients in accordance with the indication. In some examples, if the network entity 105-*a* indicates for the UE 115-*a* to not report the wideband coefficients, the UE 115-*a* may average the RSRP that is reported (e.g., calculate the RSRP assuming equal wideband coefficients). In some examples, the report transmitted by the UE 115-*a* may include metrics (e.g., MI, RSRP) for CRIs in a decreasing order of individual computed RSRPs. For example, the UE 115-*a* may report a first CRI with a highest RSRP, followed by a second CRI with a second highest RSRP, and so on. The UE 115-*a* may further map each respective reported CRI to a respective next wideband coefficient (e.g., a next wideband coefficient that has not been reported) based on the ordinal position (e.g., in the decreasing order of individual computed RSRPs). That is, the UE 115-*a* may map the first CRI with a first wideband coefficient, the second CRI with a second wideband coefficient, and so on (e.g., for wideband coefficients stacked in order, such as the wideband coefficients in Table 1). A feedback overhead associated with reporting the wideband coefficients may be $K*CRI+(K-1)*N_{ZC}$ where K is a quantity associated with a quantity of MIMO layers used by the UE 115-*a*, CRI is a quantity of CRIs reported by the UE, and a non-zero coefficient $N_{ZC}$ is a quantity of possible values for the wideband coefficients. As an illustrative example, if the UE 115-*a* communicates using rank 4 MIMO communications, the UE 115-*a* may report K=three wideband coefficients. If the UE 115-*a* may use 8 possible wideband coefficient values, the UE 115-*a* may use three bits to report $N_{ZC}$.

Based on receiving the report from the UE 115-*a* (e.g., a report indicating one or more MI metric values, RSRP, and/or the wideband coefficients), the network entity 105-*a* may configure a new multi-port CSI-RS resource. The CSI-RS resource may be based on the MI metric values defined in the report. For example, the network entity 105-*a* may configure the CSI-RS resource with transmit beams 205 associated with a relatively high MI metric. In some examples, a QCL source for each of the multiple ports of the multi-port CSI-RS resource may be derived from an original CSI-RS configuration (e.g., the CSI-RS resource configuration with repetition set to 'on') and the one or more wideband coefficient values. In some examples, one or more demodulation reference signals (DM-RSs) may be QCL'ed with reported CRIs (e.g., CRIs reported in the enhanced CSI report). The QCL'ed DM-RSs may act as the source reference signals and precoders for the UE 115-*a* based on one or more reported weights or PMI. In some examples, the network entity 105-*a* may indicate to the UE 115-*a* whether the one or more reported wideband coefficients have been applied. The UE 115-*a* may perform CSI reporting based on the indication of whether the one or more wideband coefficients have been applied.

In some aspects, to facilitate MI reporting, the network entity 105-*a* may transmit an enhanced CSI-RS resource configuration to the UE 115-*a*. Each resource of the enhanced CSI-RS resource configuration may include two ports (e.g., H and V ports). The network entity 105-*a* may additionally transmit a report configuration with a new report quantity (e.g., MI). The report configuration may indicate an SNR reference and/or a MIMO rank hypothesis. Based on the CSI-RS resource configuration, the UE 115-*a* may measure one or more reference signals from each of the transmit beams 205 via each of the receive beams 210 and determine a MI metric. The UE 115-*a* may transmit an enhanced CSI report (e.g., a single report or a two-part report) indicating the MI metric and/or one or more wideband coefficients. The network entity 105-*a* may determine a new CSI-RS resource set based on the enhanced CSI-RS report from the UE 115-*a*. The network entity 105-*a* may indicate the new CSI-RS resource set to the UE 115-*a*, and the UE 115-*a* may measure and report one or more other CSI metrics (e.g., PMI, CQI) in an additional CSI report based on the new CSI-RS resource set. Such techniques are described in further detail with reference to FIGS. 3-5.

In some examples, the network entity 105-*a* may configure one or more resource settings, resource sets, or resources within a report configuration or separate from the reporting configuration. In some examples, repetition may not be enabled initially. In such examples, the UE 115-*a* may perform UE-side beam refinement (e.g., based on the new report quantity MI). In some examples, resource configurations, transmission of resources, measurements, report configurations, reporting, and so on described herein may occur at a same time (e.g., parallelly), in different orders timelines, or in accordance with different timelines.

Figure 3:
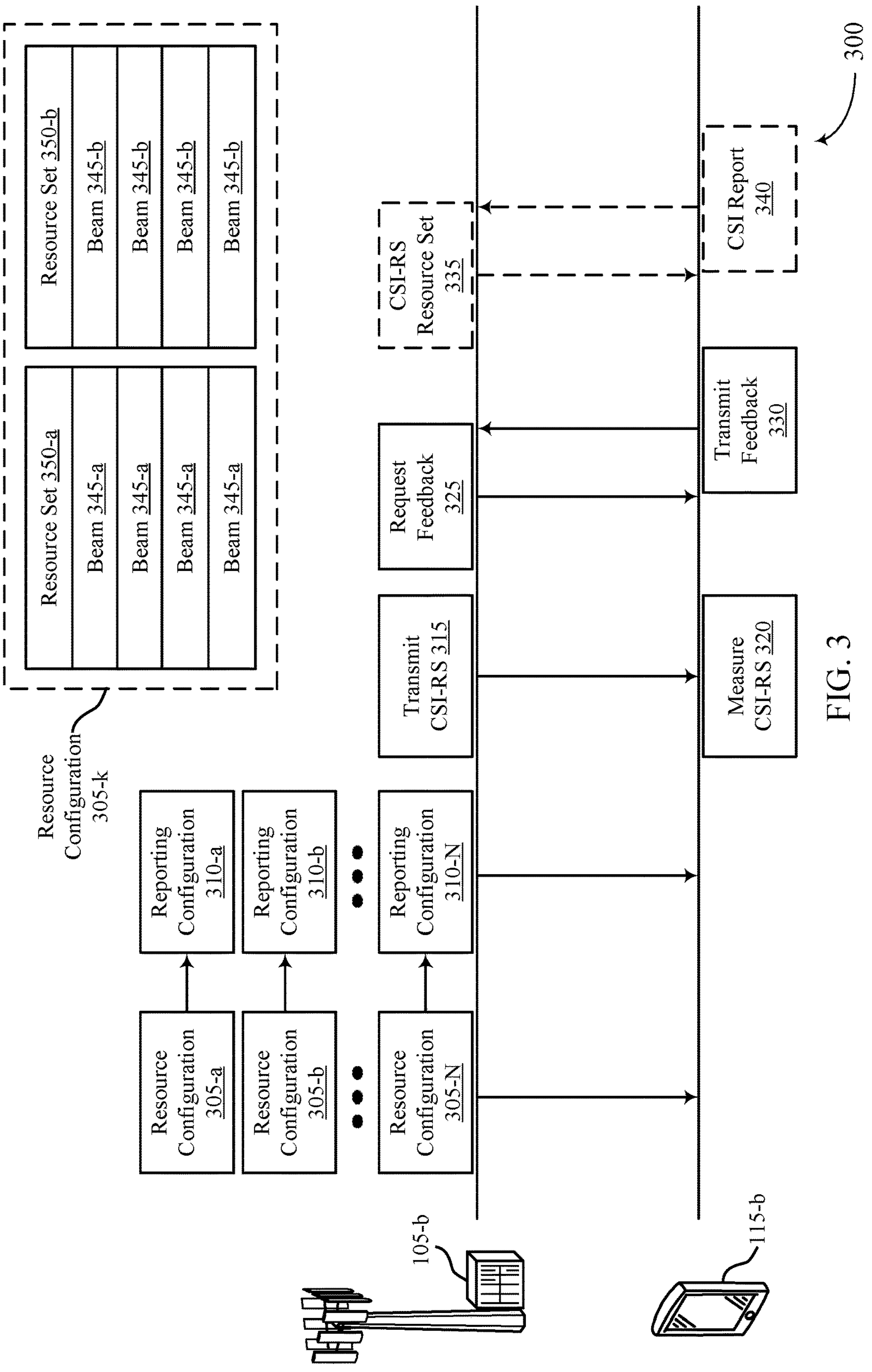
FIG. 3 shows an example of a signaling diagram that supports reporting MI for multi-beam operations in accordance with one or more aspects of the present disclosure.

FIG. 3 shows an example of a signaling diagram 300 that supports reporting MI for multi-beam operations in accordance with one or more aspects of the present disclosure. The signaling diagram 300 may implement or may be implemented by aspects of the wireless communications system 100 or the wireless communications system 200. For example, the signaling diagram 300 may include a UE 115 (e.g., a UE 115-*b*) and a network entity 105 (e.g., a network entity 105-*b*), which may be examples of the corresponding devices as described with reference to FIG. 1.

As illustrated with reference to the signaling diagram 300, a network entity 105-*b* may configure multiple resource configurations 305 (e.g., resource settings) and reporting configurations 310 (e.g., report settings) for a UE 115-*b* to determine a combination of beams ($f_1$*, $f_2$*, $w_1$*, $w_2$*) that may result in relatively higher channel quality and achievable rank than some other combinations of beams. For example, the network entity 105-*b* may transmit a resource configuration 305-*a*, a resource configuration 305-*b*, and so on through a resource configuration 305-N to the UE 115-*b*.

In some examples, each resource configuration 305 may have a different combination of transmit beams ($f_1$, $f_2$). That is, each CSI-RS resource setting may have two resource sets with repetition enabled, and each resource set i may have resources over which the network entity 105-*b* may transmit with a transmit beam $f_i$. For example, a resource configuration 305-*k* may include a first resource set 350-*a* indicating a plurality of resources for a beam 345-*a* (e.g., with repetition set to 'on'), and a second resource set 350-*b* indicating a plurality of resources for a beam 345-*b* (e.g., with repetition set to 'on') such that the UE 115-*b* may measure each pair of transmit beams using each pair of receive beams of the UE 115-*b*. Each resource set 350 may have a same quantity of resources (e.g., greater than one resources). In some examples, the described techniques may be extended to multiple resource sets with repetition enabled.

The network entity 105-*b* may transmit multiple reporting configurations 310 to the UE 115-*b* (e.g., a reporting configuration 310-*a*, a reporting configuration 310-*b*, and so on through a reporting configuration 310-N) each corresponding to (e.g., linked to) one of the resource configurations 305. The multiple reporting configurations 310 may indicate a new report quantity for the UE 115-*b* to report MI (e.g., a parameter cri-RSRP-MI).

At step 315, the network entity 105-*b* may transmit CSI-RSs according to the resource configurations 305. At step 320, the UE 115-*b* may receive and measure the CSI-RSs. To receive the CSI-RSs, the UE 115-*b* may apply a same QCL typeD reference signal assumption for receiving a $k^{th}$ non-zero power (NZP) CSI-RS resource in the resource set 350-*a* as for receiving a $k^{th}$ NZP CSI-RS resource in the resource set 350-*b*. The UE 115-*b* may accordingly measure each pair of transmit beams configured in each resource configuration 305 with a plurality of receive beams to determine a pair of receive beams ($w_1$*, $w_2$*) for a configured resource setting (e.g., a specific resource configuration 305 for $f_1$, $f_2$).

For example, at step 325, the network entity 105-*b* may transmit a request to the UE 115-*b* indicating a specific reporting configuration 310 corresponding to the specific resource configuration 305. That is, the network entity 105-*b* may transmit a request for CSI feedback linked to a report setting k (e.g., with a specific resource configuration identifier (ID)). The UE 115-*b* may accordingly compute a MI metric associated with the configured transmit beams and the determined pair of receive beams ($f_1$*, $f_2$, $w_1$*, $w_2$*). Additionally, or alternatively, the UE 115-*b* may determine one or more wideband coefficients associated with the specific resource configuration 305 and may compute an RSRP (e.g., a single RSRP) conditioned on the one or more wideband coefficients, as described with reference to FIG. 2.

At step 330, the UE 115-*b* may transmit a feedback report to the network entity 105-*b* based on the specific reporting configuration 310. The feedback report may indicate the computed MI metric, the RSRP, the one or more wideband coefficients, or some combination thereof. In some examples, the network entity 105-*b* may request for the UE 115-*b* to report the wideband coefficients.

In some examples, at step 335, the network entity 105-*b* may transmit a CSI-RS resource set associated with a resource configuration ID (e.g., and ID of the resource configuration 305 for which the UE 115-*b* reported MI). In some examples, the CSI-RS resource set may have repetition enabled. The UE 115-*b* may measure CSI-RSs via the CSI-RS resource set using a QCL assumption derived from the original resource configuration 305 associated with the resource configuration ID and/or the one or more wideband coefficients. At step 340, the UE 115-*b* may transmit a CSI report based on measuring the CSI-RSs. For example, the UE 115-*b* may transmit a CSI report indicating PMI and/or CQI calculated based on measuring the CSI-RSs.

Figure 4:
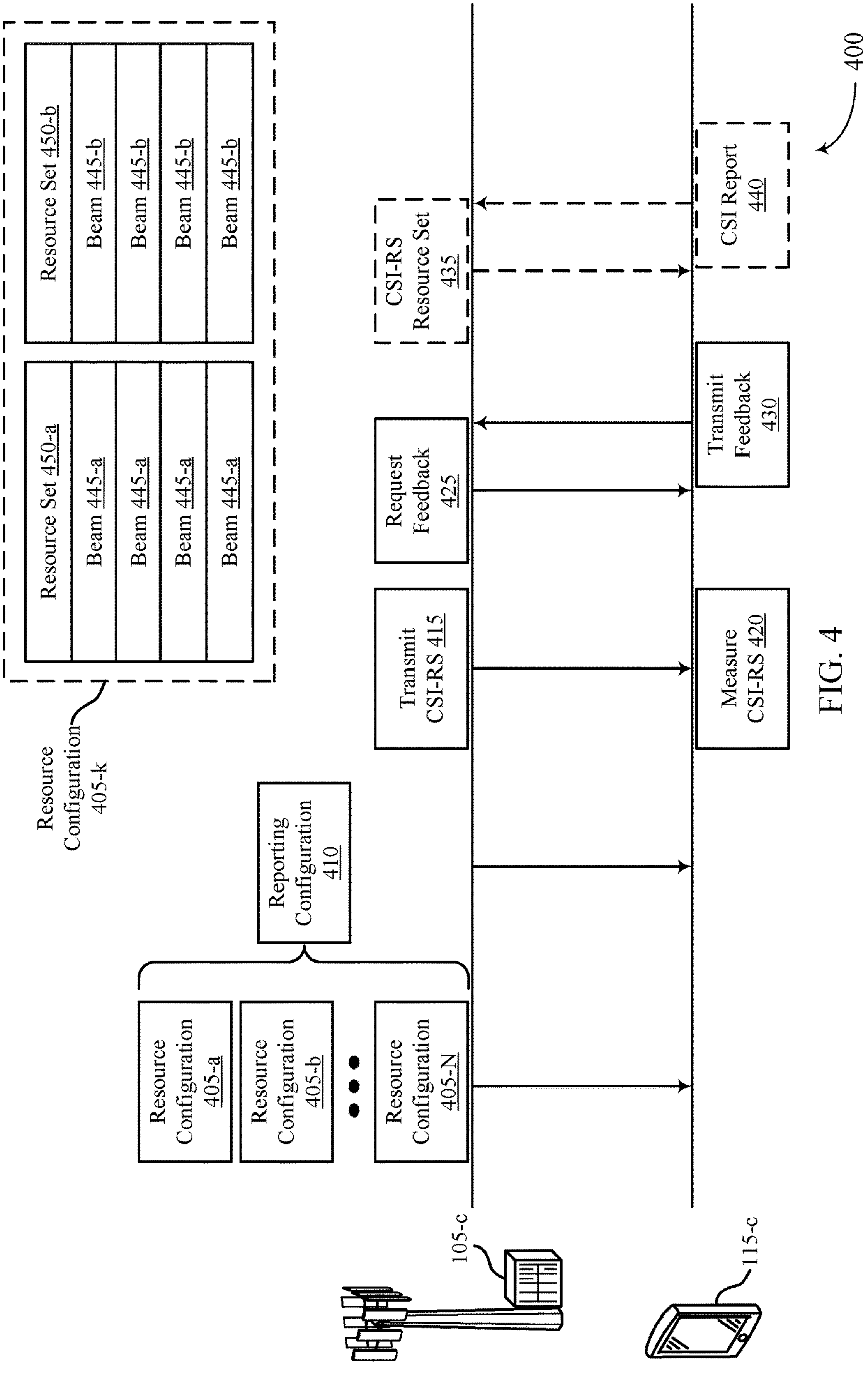
FIG. 4 shows an example of a signaling diagram that supports reporting MI for multi-beam operations in accordance with one or more aspects of the present disclosure.

FIG. 4 shows an example of a signaling diagram 400 that supports reporting MI for multi-beam operations in accordance with one or more aspects of the present disclosure. The signaling diagram 400 may implement or may be implemented by aspects of the wireless communications system 100, the wireless communications system 200, or the signaling diagram 300. For example, the signaling diagram 400 may include a UE 115 (e.g., a UE 115-*c*) and a network entity 105 (e.g., a network entity 105-*c*), which may be examples of the corresponding devices as described with reference to FIG. 1.

As illustrated with reference to the signaling diagram 400, a network entity 105-*c* may configure multiple resource configurations 405 (e.g., resource settings) and a single reporting configuration 410 (e.g., a report setting) for a UE 115-*c* to determine a combination of beams ($f_1$*, $f_2$*, $w_1$*, $w_2$*) that may result in relatively higher channel quality and achievable rank than some other combinations of beams. For example, the network entity 105-*c* may transmit a resource configuration 405-*a*, a resource configuration 405-*b*, and so on through a resource configuration 405-N to the UE 115-*c*. In some examples, each resource configuration 405 may have a different combination of transmit beams ($f_1$, $f_2$). That is, each CSI-RS resource setting may have a two resource sets with repetition enabled, and each resource set i may have resources over which the network entity 105-*c* may transmit with a transmit beam $f_i$. For example, a resource configuration 405-*k* may include a first resource set 450-*a* indicating a plurality of resources for a beam 445-*a* (e.g., with repetition set to 'on'), and a second resource set 450-*b* indicating a plurality of resources for a beam 445-*b* (e.g., with repetition set to 'on') such that the UE 115-*c* may measure each pair of transmit beams using each pair of receive beams of the UE 115-*c*. Each resource set 450 may have a same quantity of resources (e.g., greater than one resources). In some examples, the described techniques may be extended to multiple resource sets with repetition enabled.

The network entity 105-*c* may transmit the single reporting configuration 410 to the UE 115-*c* corresponding to (e.g., linked to) all of the resource configurations 405. The reporting configuration 410 may indicate a new report quantity for the UE 115-*c* to report MI (e.g., a parameter cri-RSRP-MI).

At step 415, the network entity 105-*c* may transmit CSI-RSs according to the resource configurations 405. At step 420, the UE 115-*c* may receive and measure the CSI-RSs. To receive the CSI-RSs, the UE 115-*c* may apply a same QCL typeD reference signal assumption for receiving a $k^{th}$ NZP CSI-RS resource in the resource set 450-*a* as for receiving a $k^{th}$ NZP CSI-RS resource in the resource set 450-*b*. The UE 115-*c* may accordingly measure each pair of transmit beams configured in each resource configuration 405 with a plurality of receive beams to determine a pair of receive beams ($w_1$*, $w_2$*) for a configured resource setting (e.g., a specific resource configuration 405 for $f_1$, $f_2$).

For example, at step 425, the network entity 105-*c* may transmit a request to the UE 115-*c* indicating a specific resource configuration 305. That is, the network entity 105-*c* may transmit a request for CSI feedback linked to a resource setting k (e.g., with a specific resource configuration ID). The UE 115-*c* may accordingly compute a MI metric associated with the configured transmit beams and the determined pair of receive beams ($f_1$*, $f_2$, $w_1$*, $w_2$*). Additionally, or alternatively, the UE 115-*c* may determine one or more wideband coefficients associated with the specific resource configuration 405 and may compute an RSRP (e.g., a single RSRP) conditioned on the one or more wideband coefficients, as described with reference to FIG. 2. In some examples, the UE 115-*c* may determine the MI metric autonomously (e.g., without receiving a request from the network entity 105-*c*).

At step 430, the UE 115-*c* may transmit a feedback report to the network entity 105-*c* based on the reporting configuration 410. The feedback report may indicate the computed MI metric, the RSRP, the one or more wideband coefficients, or some combination thereof. In some examples, the network entity 105-*c* may request for the UE 115-*c* to report the wideband coefficients. In some examples (e.g., if the network entity 105-*c* does not indicate a specific resource configuration 405 for the UE 115-*c* to report MI), the UE 115-*c* may report a computed MI metric associated with beams selected by the UE 115-*c* (e.g., beams with a lowest MI metric and/or a highest RSRP). The feedback report may additionally indicate the resource setting ID (e.g., a parameter CSI-ResourceConfigId) of the specific resource configuration 405 or of a resource configuration 405 associated with the beams selected by the UE 115-*c* to specify a preferred transmit beam pair $f_1$, $f_2$.

In some examples, at step 435, the network entity 105-*c* may transmit a CSI-RS resource set associated with a resource configuration ID (e.g., an ID of the resource configuration 405 for which the UE 115-*c* reported MI). In some examples, the CSI-RS resource set may have repetition enabled. The UE 115-*c* may measure CSI-RSs via the CSI-RS resource set using a QCL assumption derived from the original resource configuration 405 associated with the resource configuration ID and/or the one or more wideband coefficients. At step 440, the UE 115-*c* may transmit a CSI report based on measuring the CSI-RSs. For example, the UE 115-*b* may transmit a CSI report indicating PMI and/or CQI calculated based on measuring the CSI-RSs.

Figure 5:
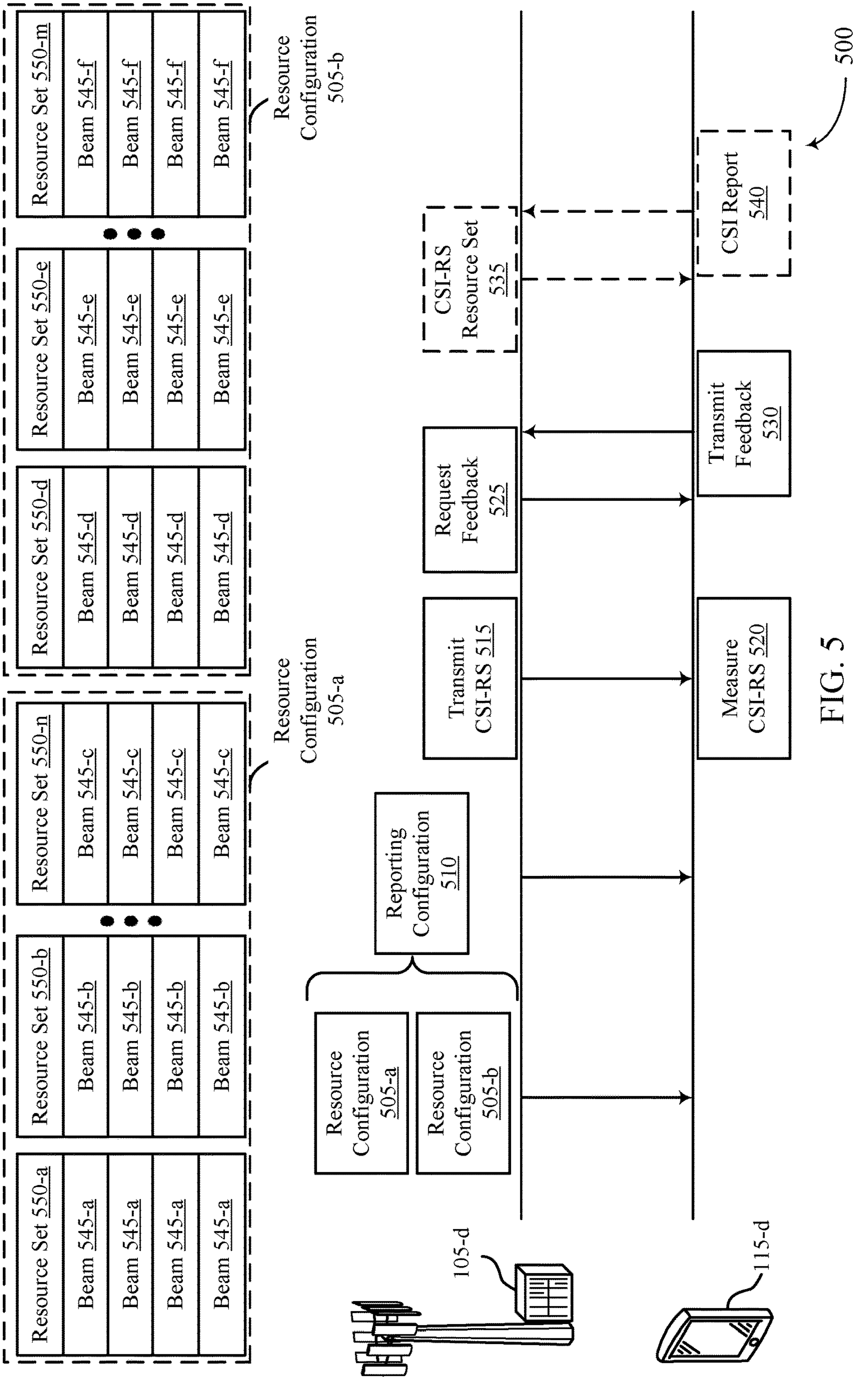
FIG. 5 shows an example of a signaling diagram that supports reporting MI for multi-beam operations in accordance with one or more aspects of the present disclosure.

FIG. 5 shows an example of a signaling diagram 500 that supports reporting MI for multi-beam operations in accordance with one or more aspects of the present disclosure. The signaling diagram 500 may implement or may be implemented by aspects of the wireless communications system 100, the wireless communications system 200, the signaling diagram 300, or the signaling diagram 400. For example, the signaling diagram 500 may include a UE 115 (e.g., a UE 115-*d*) and a network entity 105 (e.g., a network entity 105-*d*), which may be examples of the corresponding devices as described with reference to FIG. 1.

As illustrated with reference to the signaling diagram 500, a network entity 105-*d* may configure multiple resource configurations 505 (e.g., resource settings) and a single reporting configuration 510 (e.g., a report setting) for a UE 115-*d* to determine a combination of beams ($f_1$*, $f_2$*, $w_1$*, $w_2$*) that may result in relatively higher channel quality and achievable rank than some other combinations of beams. For example, the network entity 105-*d* may transmit a resource configuration 505-*a* and a resource configuration 505-*b* to the UE 115-*d*. In some examples, each resource configuration 505 may have a multiple combinations of transmit beams. That is, each CSI-RS resource setting may have multiple resource sets 550 with repetition enabled, and each resource set i may have resources over which the network entity 105-*d* may transmit with a transmit beam $f_i$. That is, each resource set 550 in the resource configuration 505-*a* may indicate resources for a specific transmit beam $f_1$, and each resource set 550 in the resource configuration 505-*b* may indicate resources for a specific transmit beam $f_2$.

For example, the resource configuration 405-*a* may include a first resource set 550-*a* indicating a plurality of resources for a beam 545-*a*, a second resource set 550-*b* indicating a plurality of resources for a beam 545-*b*, and so on through a resource set 550-*n* indicating a plurality of resources for a beam 545-*c*. The resource configuration 405-*b* may include a first resource set 550-*d* indicating a plurality of resources for a beam 545-*d*, a second resource set 550-*e* indicating a plurality of resources for a beam 545-*e*, and so on through a resource set 550-*m* indicating a plurality of resources for a beam 545-*f*. Accordingly, the UE 115-*c* may measure each pair of transmit beams using each pair of receive beams of the UE 115-*c*. Each resource configuration 505-*a* and the resource configuration 505-*b* may have a same quantity of resource sets 550, and each resource set 550 may have a same quantity of resources (e.g., greater than one resources).

The network entity 105-*d* may transmit the single reporting configuration 510 to the UE 115-*d* corresponding to (e.g., linked to) both of the resource configurations 505. The reporting configuration 510 may indicate a new report quantity for the UE 115-*d* to report MI (e.g., a parameter cri-RSRP-MI). In some examples, the described techniques may be extended to a greater quantity of x-pol transmission and reception panels (e.g., greater than two) at the UE 115-*d* and the network entity 105-*d*. For example, the network entity 105-*d* may configure the UE 115-*d* with more than two resource configurations 505 associated with the single reporting configuration 510. When extended to multiple resource settings, the UE 115-*d* may report as many CRIs as the quantity of resource settings (e.g., quantity of resource configurations 505).

At step 515, the network entity 105-*d* may transmit CSI-RSs according to the resource configurations 505. At step 520, the UE 115-*d* may receive and measure the CSI-RSs. To receive the CSI-RSs, the UE 115-*d* may apply a same QCL typeD reference signal assumption for receiving a $k^{th}$ NZP CSI-RS resource in the resource set 550-*a* as for receiving a $k^{th}$ NZP CSI-RS resource in the resource set 550-*b*. The UE 115-*d* may accordingly measure each pair of transmit beams configured in the resource configurations 505 with a plurality of receive beams to determine one or more pairs of receive beams ($w_1$*, $w_2$*) for one or more pairs of transmit beams ($f_1$, $f_2$) (e.g., in each resource configuration 505).

For example, at step 525, the network entity 105-*d* may transmit a request to the UE 115-*d* for the UE 115-*d* to report MI for each resource configuration 505. That is, the network entity 105-*d* may transmit a request for CSI feedback linked to one or more CRIs (e.g., pairs of transmit beams) in the resource configuration 505-*a* and one or more resource sets 550 in the resource configuration 505-*b*. The UE 115-*d* may accordingly compute a MI metric for each resource configuration 505 associated with the configured transmit beams and one or more determined pairs of receive beams ($f_1$*, $f_2$*, $w_1$*, $w_2$*). Additionally, or alternatively, the UE 115-*d* may determine one or more wideband coefficients associated with each resource configuration 505 and may compute an RSRP for each resource configuration 505 conditioned on the one or more wideband coefficients, as described with reference to FIG. 2. In some examples, the UE 115-*d* may determine the MI metrics autonomously (e.g., without receiving a request from the network entity 105-*d*).

At step 530, the UE 115-*d* may transmit a feedback report to the network entity 105-*d* based on the reporting configuration 510. The feedback report may indicate the computed MI metrics, the RSRP, the one or more wideband coefficients, a CRI from each of the resource configurations 505 (e.g., two distinct CRIs each associated with one of the computed MI metrics), or some combination thereof. In some examples, the network entity 105-*d* may request for the UE 115-*d* to report the wideband coefficients. In some examples (e.g., if the network entity 105-*d* does not indicate a specific CRI for the UE 115-*d* to report MI), the UE 115-*d* may report computed MI metrics associated with beams selected by the UE 115-*d* (e.g., beams with a lowest MI metric and/or a highest RSRP). The two distinct CRI may be associated with the beams selected by the UE 115-*c* to specify a preferred transmit beam pair $f_1$, $f_2$ for each resource configuration 505.

In some examples, at step 535, the network entity 105-*d* may transmit a CSI-RS resource set with repetition enabled. The UE 115-*d* may measure CSI-RSs via the CSI-RS resource set using a QCL assumption derived from the original resource configurations 505 associated with the resource configuration ID and/or the one or more wideband coefficients. At step 540, the UE 115-*d* may transmit a CSI report based on measuring the CSI-RSs. For example, the UE 115-*d* may transmit a CSI report indicating PMI and/or CQI calculated based on measuring the CSI-RSs.

Figure 6:
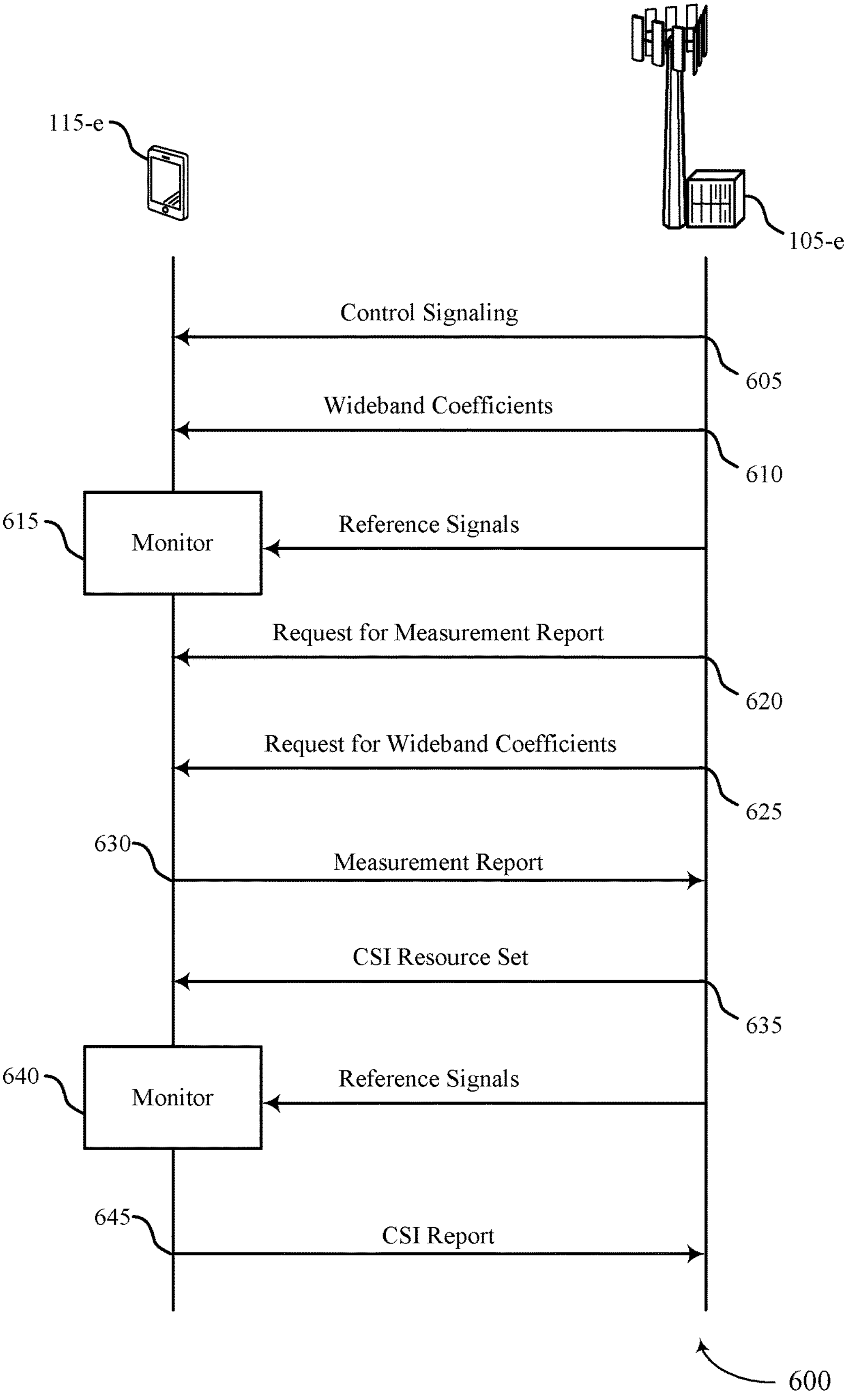
FIG. 6 shows an example of a process flow that supports reporting MI for multi-beam operations in accordance with one or more aspects of the present disclosure.

FIG. 6 shows an example of a process flow 600 that supports reporting MI for multi-beam operations in accordance with one or more aspects of the present disclosure. The process flow 600 may implement or may be implemented by aspects of the wireless communications system 100, the wireless communications system 200, the signaling diagram 300, the signaling diagram 400, or the signaling diagram 500. For example, the process flow 600 may include a UE 115 (e.g., a UE 115-*e*) and a network entity 105 (e.g., a network entity 105-*e*), which may be examples of the corresponding devices as described with reference to FIG. 1.

In the following description of the process flow 600, the operations between the UE 115-*e* and the network entity 105-*e* may be transmitted in a different order than the example order shown. Some operations may also be omitted from the process flow 600, and other operations may be added to the process flow 600. Further, although some operations or signaling may be shown to occur at different times for discussion purposes, these operations may actually occur at the same time.

At 605, the UE 115-*e* may receive, from the network entity 105-*e*, control signaling indicating a plurality of resource set configurations and at least one reporting configuration. The control signaling may indicate that repetition is enabled for one or more first transmit beams of a set of transmit beams for a first resource set and one or more second transmit beams of the set of transmit beams for a second resource set. For example, a first resource set configuration of the plurality of resource set configurations may indicate that beam repetition is enabled for transmissions via the first beam for the first resource set, and via the second beam for the second resource set. Additionally, or alternatively, the first resource set configuration may indicate that beam repetition is enabled for transmissions via the first beam for the first resource set and the second resource set configuration may indicate that beam repetition is enabled for transmissions via the second beam for the second resource set.

In some examples, the control signaling may indicate for the UE 115-*e* to report an MI metric associated with the first beam and the second beam (e.g., and one or more receive beams of the UE 115-*a*). For example, the network entity 105-*a* may request the MI metric via the at least one reporting configuration.

In some examples, the at least one reporting configuration may comprise a plurality of reporting configurations each corresponding to a respective one of the plurality of resource set configurations. In some examples, the at least one reporting configuration may comprise a single reporting configuration. In some examples, the plurality of resource set configurations may include a first resource set configuration and a second resource set configuration.

In some examples, at 610, the network entity 105-*e* may transmit, to the UE 115-*e*, second control signaling indicating a plurality of predefined wideband coefficient values for the UE 115-*e* to select from. The plurality of predefined wideband coefficient values may represent a weighting of transmission power for the set of transmit beams. The UE 115-*e* may use the plurality of wideband coefficients, for example, to calculate RSRP or MI.

At 615, the UE 115-*e* may monitor for a first reference signal transmission via the first transmit beam and a second reference signal transmission via the second transmit beam. The UE 115-*e* may monitor for the first reference signal transmission in accordance with the first resource set configuration, and may monitor for the second reference signal transmission in accordance with the first resource set configuration or a second resource set configuration (e.g., via resources defined by the first resource set configuration and the second resources set configuration). The network entity 105-*e* may transmit the first reference signal transmission and the second reference signal transmission via the first transmit beam and the second transmit beam, respectively.

At 620, the network entity 105-*e* may transmit a request to the UE 115-*e* indicating for the UE 115-*e* to transmit a measurement report. The request may indicate a reporting configuration ID associated with one of the at least one reporting configuration. For example, if the at least one reporting configuration is a plurality of reporting configurations, the request may indicate to use a first reporting configuration of the plurality of reporting configurations.

At 625, the network entity 105-*e* may transmit a request to the UE 115-*e* indicating for the UE 115-*e* to report one or more wideband coefficients. In some examples, the one or more wideband coefficients may include one or more of the predefined wideband coefficient values.

At 630, the UE 115-*e* may transmit a measurement report to the network entity 105-*e* (e.g., in accordance with at least one of the at least one reporting configurations). The measurement report may indicate a first MI metric based on a measurement of the first reference signal and/or a measurement of the second reference signal. The measurement report may indicate an RSRP based at least in part on one or more wideband coefficients associated with the first transmit beam or the second transmit beam (e.g., from the one or more predefined wideband coefficients). The measurement report may include one or more of the predefined wideband coefficients (e.g., in accordance with the request to report the wideband coefficients). In some examples, the UE 115-*e* may transmit the measurement report in response to the request (e.g., in accordance with the indicated reporting configuration).

In some examples, the measurement report may indicate a first resource set configuration of the plurality of resource set configurations. The first resource set configuration may be associated with a preferred beam pair of a plurality of beam pairs associated with the plurality of resource set configurations (e.g., including one or both of the first transmit beam and the second transmit beam) The UE 115-*e* may determine the preferred beam pair based at least in part on the first MI metric or one or more additional MI metrics.

In some examples (e.g., if the plurality of resource set configurations comprises a first resource configuration and a second resource configuration), the measurement report may indicate the first MI metric associated with the first resource configuration and a second MI metric associated with a second resource configuration. The first MI metric and the second MI metric may be associated with one or more preferred beam pairs of the first resource set configuration and the second resource set configuration. The UE 115-*e* may determine the one or more preferred beam pairs based at least in part on the first MI metric and the second MI metric.

At 635, the UE 115-*e* may receive, from the network entity 105-*e*, second control signaling indicating a CSI-RS resource set based on the measurement report. For example, the CSI-RS resource set may indicate for the UE 115-*e* to receive one or more additional reference signals via the first beam and/or the second beam based on the first MI metric.

At 640, the network entity 105-*e* may transmit and the UE 115-*e* may monitor for one or more CSI-RSs via one or more resources in the CSI-RS resource set. At 645, the UE 115-*e* may transmit, to the network entity 105-*e*, a second measurement report (e.g., a CSI-RS report) indicating one or more of a channel measurement, a CQI, a PMI, an RI, or one or more other measurements based on the CSI-RSs. In some examples, the channel measurement, CQI, PMI, RI, and so on may be for the first transmit beam and/or the second transmit beam.

Figure 7:
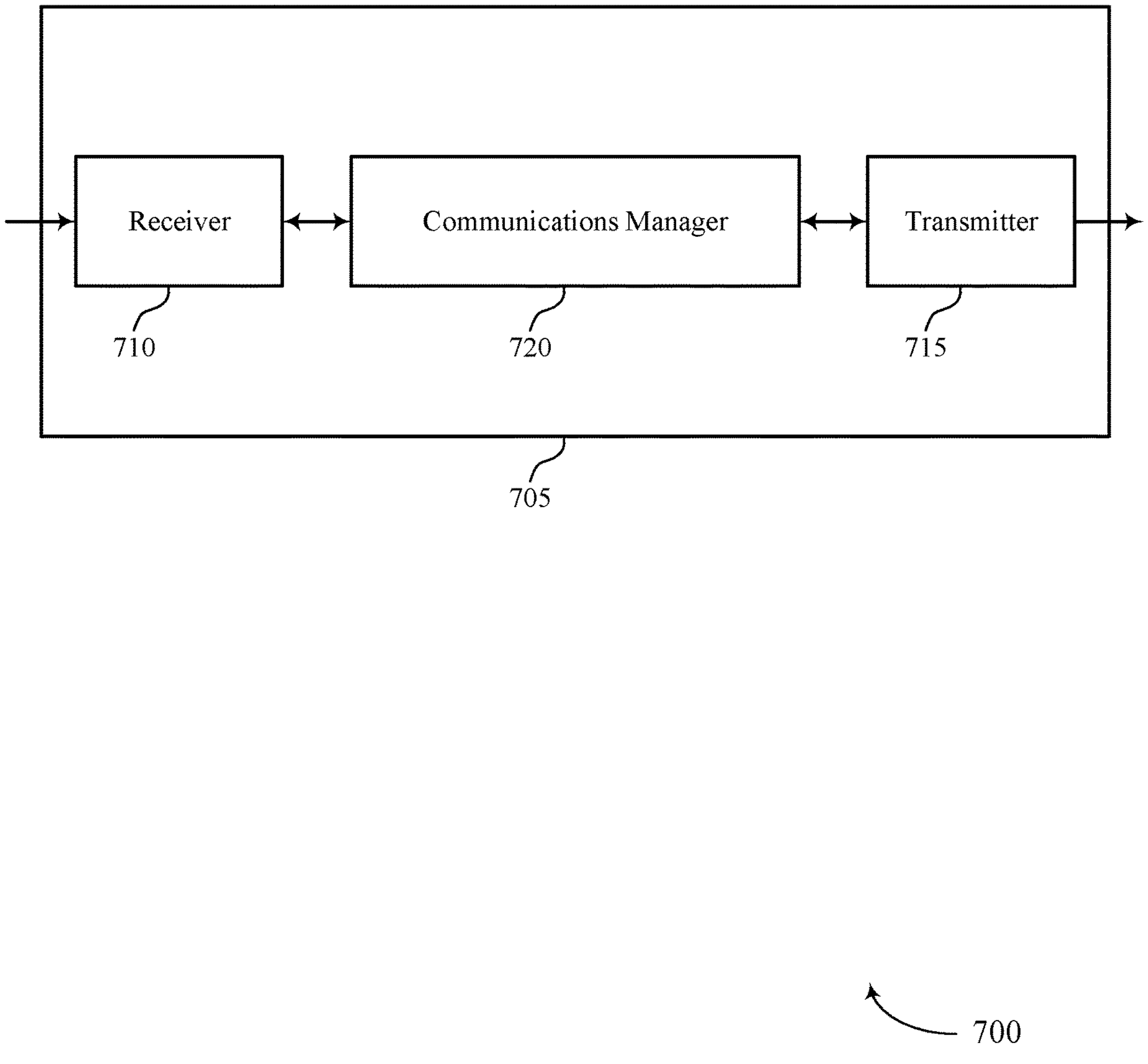
FIGS. 7 and 8 show block diagrams of devices that support reporting MI for multi-beam operations in accordance with one or more aspects of the present disclosure.

FIG. 7 shows a block diagram 700 of a device 705 that supports reporting MI for multi-beam operations in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to reporting MI for multi-beam operations). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to reporting MI for multi-beam operations). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of reporting MI for multi-beam operations as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 is capable of, configured to, or operable to support a means for receiving control signaling indicating a set of multiple resource set configurations and at least one reporting configuration, the control signaling indicating that repetition is enabled for at least a first beam for a first resource set and a second beam for a second resource set, the control signaling further requesting for the UE to report a first MI metric associated with the first beam and the second beam. The communications manager 720 is capable of, configured to, or operable to support a means for monitoring for a first reference signal transmission via the first beam in accordance with a first resource set configuration of the set of multiple resource set configurations. The communications manager 720 is capable of, configured to, or operable to support a means for monitoring for a second reference signal transmission via the second beam in accordance with the first resource set configuration or a second resource set configuration of the set of multiple resource set configurations. The communications manager 720 is capable of, configured to, or operable to support a means for transmitting, in accordance with the at least one reporting configuration, a measurement report indicating the first MI metric, the first MI metric based on at least one of a measurement associated with the first reference signal transmission or a measurement associated with the second reference signal transmission.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for reporting MI for beam management, which may allow for more efficient utilization of communication resources due to a higher achievable rank of communications.

Figure 8:
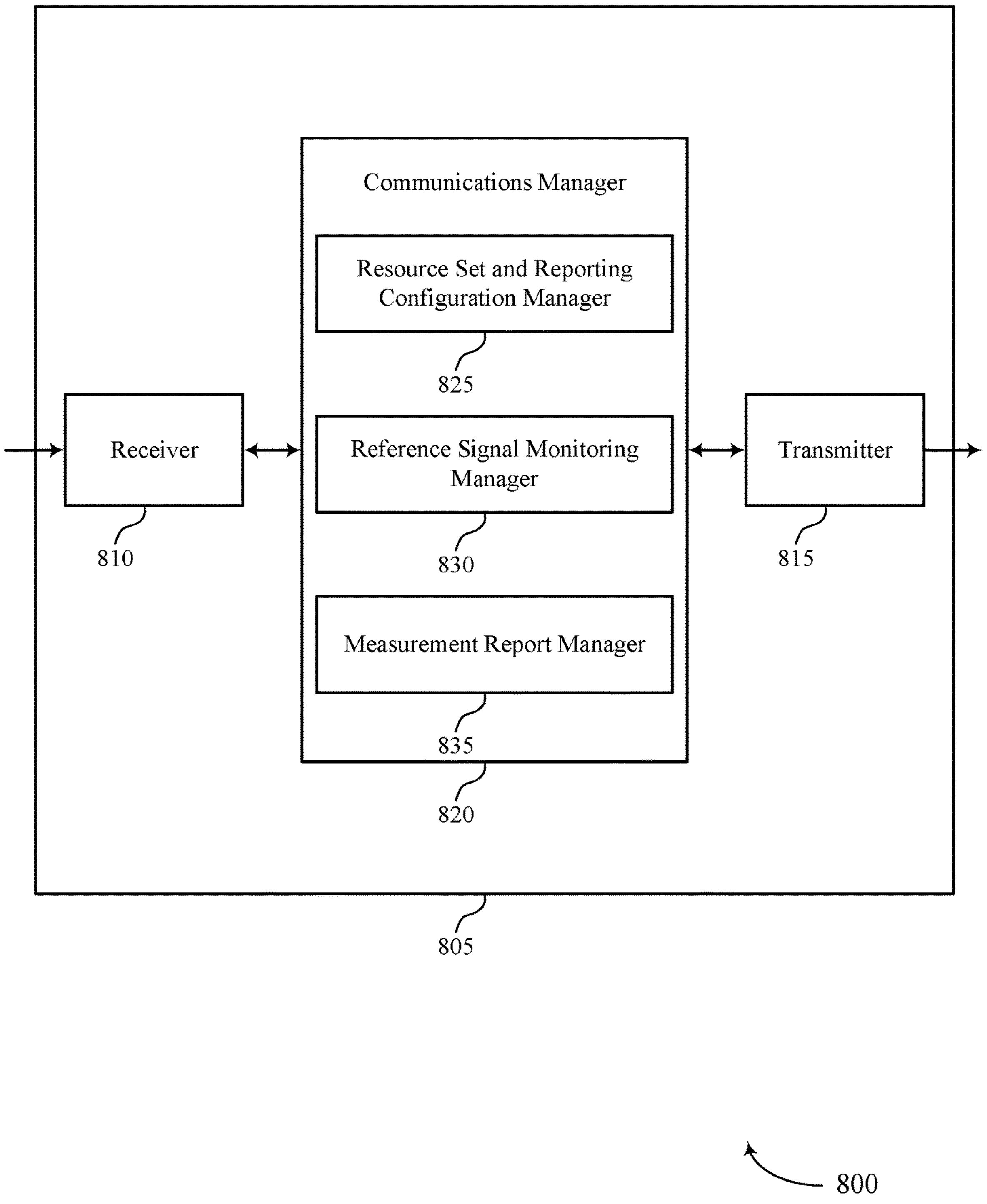

FIG. 8 shows a block diagram 800 of a device 805 that supports reporting MI for multi-beam operations in accordance with one or more aspects of the present disclosure. The device 805 may be an example of aspects of a device 705 or a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to reporting MI for multi-beam operations). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to reporting MI for multi-beam operations). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of reporting MI for multi-beam operations as described herein. For example, the communications manager 820 may include a resource set and reporting configuration manager 825, a reference signal monitoring manager 830, a measurement report manager 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The resource set and reporting configuration manager 825 is capable of, configured to, or operable to support a means for receiving control signaling indicating a set of multiple resource set configurations and at least one reporting configuration, the control signaling indicating that repetition is enabled for at least a first beam for a first resource set and a second beam for a second resource set, the control signaling further requesting for the UE to report a first MI metric associated with the first beam and the second beam. The reference signal monitoring manager 830 is capable of, configured to, or operable to support a means for monitoring for a first reference signal transmission via the first beam in accordance with a first resource set configuration of the set of multiple resource set configurations. The reference signal monitoring manager 830 is capable of, configured to, or operable to support a means for monitoring for a second reference signal transmission via the second beam in accordance with the first resource set configuration or a second resource set configuration of the set of multiple resource set configurations. The measurement report manager 835 is capable of, configured to, or operable to support a means for transmitting, in accordance with the at least one reporting configuration, a measurement report indicating the first MI metric, the first MI metric based on at least one of a measurement associated with the first reference signal transmission or a measurement associated with the second reference signal transmission.

Figure 9:
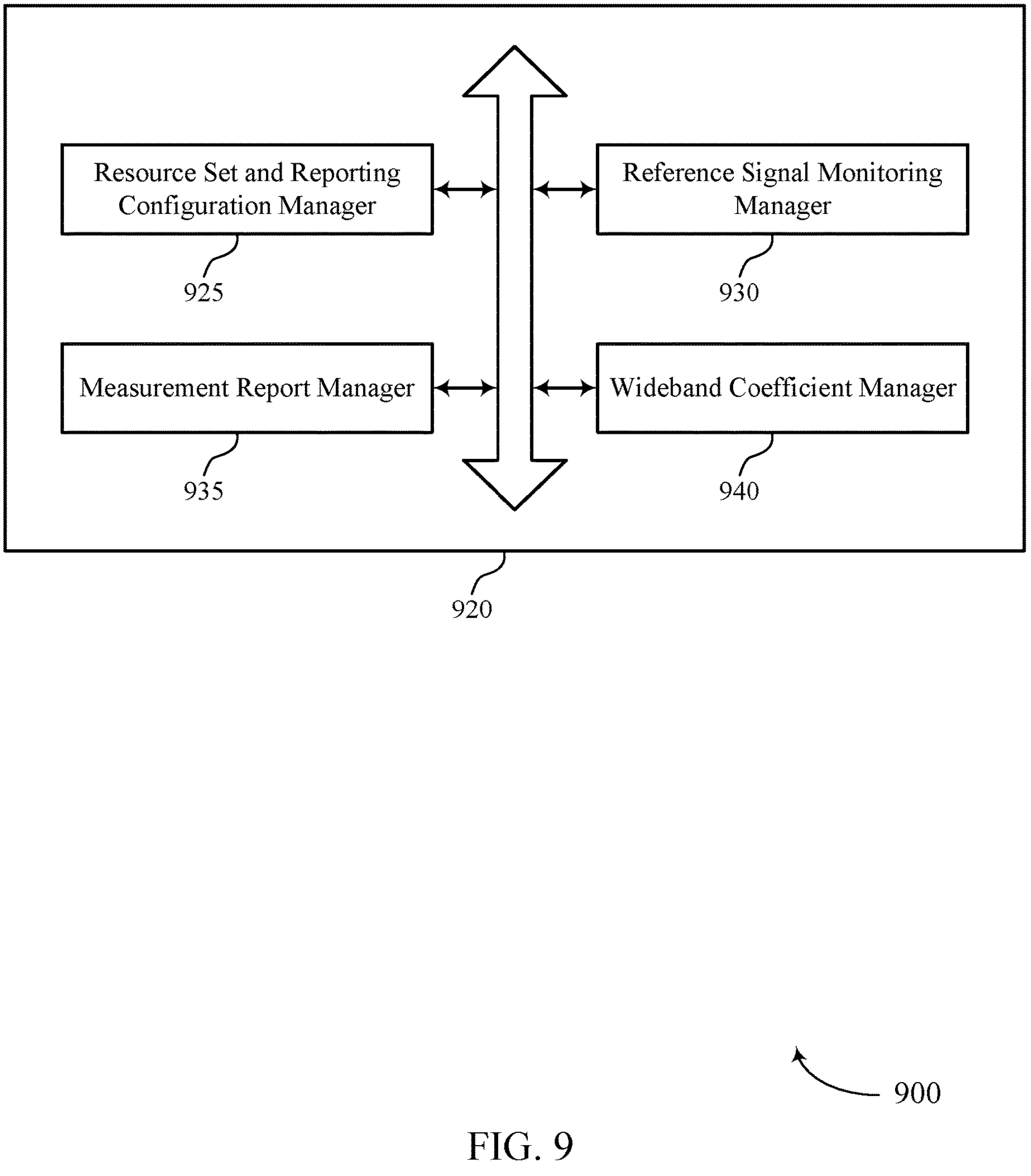
FIG. 9 shows a block diagram of a communications manager that supports reporting MI for multi-beam operations in accordance with one or more aspects of the present disclosure.

FIG. 9 shows a block diagram 900 of a communications manager 920 that supports reporting MI for multi-beam operations in accordance with one or more aspects of the present disclosure. The communications manager 920 may be an example of aspects of a communications manager 720, a communications manager 820, or both, as described herein. The communications manager 920, or various components thereof, may be an example of means for performing various aspects of reporting MI for multi-beam operations as described herein. For example, the communications manager 920 may include a resource set and reporting configuration manager 925, a reference signal monitoring manager 930, a measurement report manager 935, a wideband coefficient manager 940, or any combination thereof. Each of these components, or components or subcomponents thereof (e.g., one or more processors, one or more memories), may communicate, directly or indirectly, with one another (e.g., via one or more buses).

The communications manager 920 may support wireless communications in accordance with examples as disclosed herein. The resource set and reporting configuration manager 925 is capable of, configured to, or operable to support a means for receiving control signaling indicating a set of multiple resource set configurations and at least one reporting configuration, the control signaling indicating that repetition is enabled for at least a first beam for a first resource set and a second beam for a second resource set, the control signaling further requesting for the UE to report a first MI metric associated with the first beam and the second beam. The reference signal monitoring manager 930 is capable of, configured to, or operable to support a means for monitoring for a first reference signal transmission via the first beam in accordance with a first resource set configuration of the set of multiple resource set configurations. In some examples, the reference signal monitoring manager 930 is capable of, configured to, or operable to support a means for monitoring for a second reference signal transmission via the second beam in accordance with the first resource set configuration or a second resource set configuration of the set of multiple resource set configurations. The measurement report manager 935 is capable of, configured to, or operable to support a means for transmitting, in accordance with the at least one reporting configuration, a measurement report indicating the first MI metric, the first MI metric based on at least one of a measurement associated with the first reference signal transmission or a measurement associated with the second reference signal transmission.

In some examples, the measurement report manager 935 is capable of, configured to, or operable to support a means for receiving a request indicating for the UE to transmit the measurement report, where the request indicates a reporting configuration identification of the at least one reporting configuration.

In some examples, the at least one reporting configuration is a set of multiple reporting configurations. In some examples, each of the set of multiple resource set configurations corresponds to a respective reporting configuration of the set of multiple reporting configurations. In some examples, the request for the UE to transmit the measurement report indicates to use a first reporting configuration of the set of multiple reporting configurations.

In some examples, to support transmitting the measurement report, the measurement report manager 935 is capable of, configured to, or operable to support a means for transmitting the measurement report that indicates a first resource set configuration of the set of multiple resource set configurations, the first resource set configuration associated with a preferred beam pair of a set of multiple beam pairs associated with the set of multiple resource set configurations, the preferred beam pair based on the first MI metric or one or more additional MI metrics.

In some examples, to support transmitting the measurement report, the measurement report manager 935 is capable of, configured to, or operable to support a means for transmitting the measurement report that indicates the first MI metric associated with the first resource configuration and that indicates a second MI metric associated with the second resource configuration.

In some examples, the measurement report further indicates a RSRP, the RSRP based on one or more wideband coefficients associated with the first beam, the second beam, or both.

In some examples, the wideband coefficient manager 940 is capable of, configured to, or operable to support a means for receiving control signaling indicating a set of multiple predefined wideband coefficient values for the UE to select from when reporting at least one wideband coefficient associated with the first beam, the second beam, or both, where one or more wideband coefficients indicated in the measurement report include at least a first predefined wideband coefficient value from the set of multiple predefined wideband coefficient values.

In some examples, the wideband coefficient manager 940 is capable of, configured to, or operable to support a means for receiving control signaling indicating for the UE to report the one or more wideband coefficients.

In some examples, the measurement report manager 935 is capable of, configured to, or operable to support a means for transmitting a second measurement report indicating one or more CSI parameters, the one or more CSI parameters including a CQI, a PMI, a rank indicator, or any combination thereof, associated with the first beam and the second beam.

In some examples, the resource set and reporting configuration manager 925 is capable of, configured to, or operable to support a means for receiving second control signaling indicating a CSI-RS resource set based on the measurement report. In some examples, the reference signal monitoring manager 930 is capable of, configured to, or operable to support a means for receiving one or more CSI-RSs via a resource of the CSI-RS resource set. In some examples, the measurement report manager 935 is capable of, configured to, or operable to support a means for transmitting a CSI-RS report indicating a channel measurement, a CQI, a PMI, or any combination thereof.

In some examples, the first resource set configuration indicates that beam repetition is enabled for transmissions via the first beam for the first resource set, and via the second beam for the second resource set.

In some examples, the first resource set configuration indicates that beam repetition is enabled for transmissions via the first beam for the first resource set and the second resource set configuration indicates that beam repetition is enabled for transmissions via the second beam for the second resource set.

Figure 10:
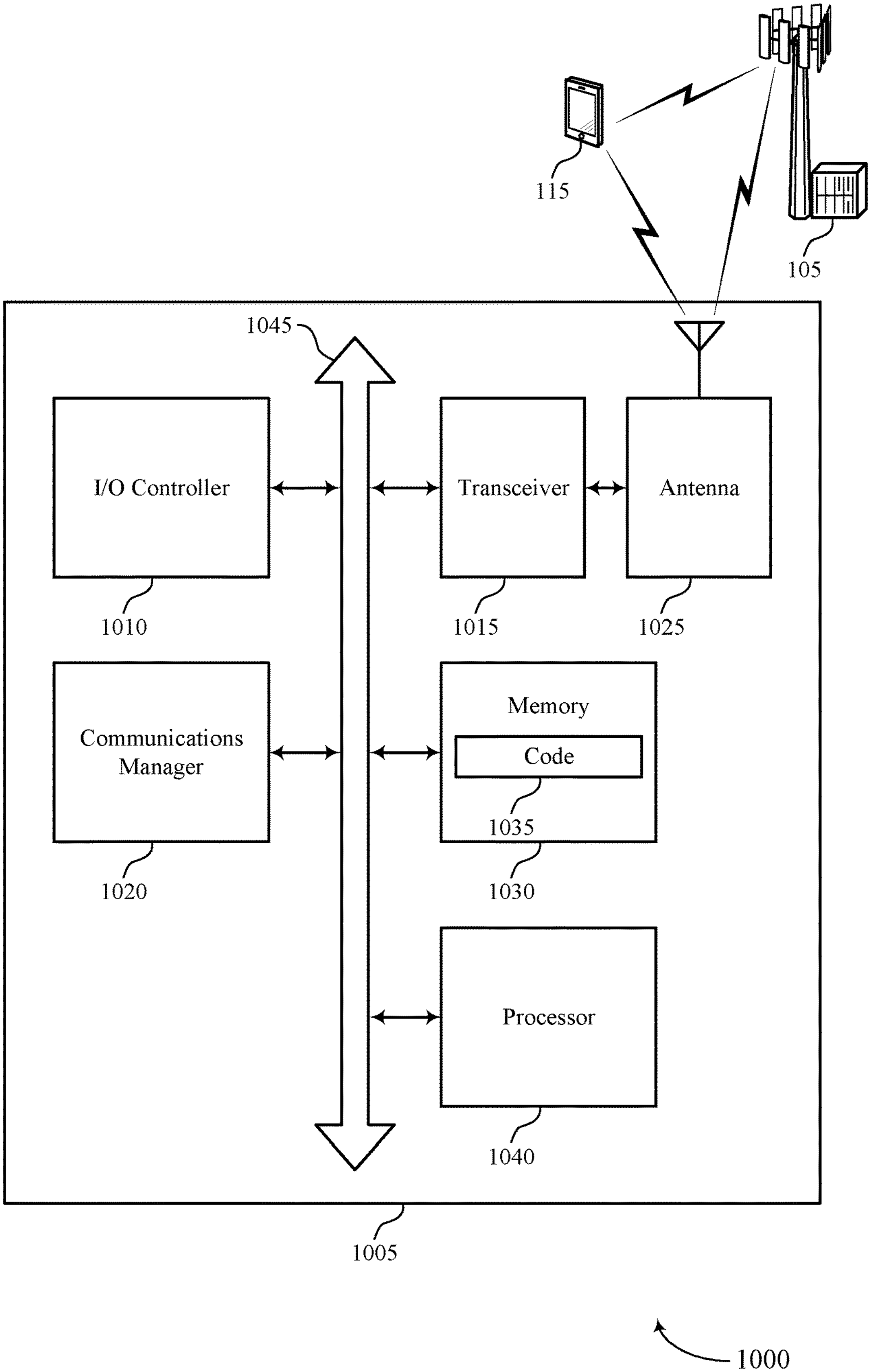
FIG. 10 shows a diagram of a system including a device that supports reporting MI for multi-beam operations in accordance with one or more aspects of the present disclosure.

FIG. 10 shows a diagram of a system 1000 including a device 1005 that supports reporting MI for multi-beam operations in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable code 1035 including instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may contain, among other things, a basic I/O system (BIOS) which may control basic hardware or software operation such as the interaction with peripheral components or devices.

The at least one processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting reporting MI for multi-beam operations). For example, the device 1005 or a component of the device 1005 may include at least one processor 1040 and at least one memory 1030 coupled with or to the at least one processor 1040, the at least one processor 1040 and at least one memory 1030 configured to perform various functions described herein. In some examples, the at least one processor 1040 may include multiple processors and the at least one memory 1030 may include multiple memories. One or more of the multiple processors may be coupled with one or more of the multiple memories, which may, individually or collectively, be configured to perform various functions herein. In some examples, the at least one processor 1040 may be a component of a processing system, which may refer to a system (such as a series) of machines, circuitry (including, for example, one or both of processor circuitry (which may include the at least one processor 1040) and memory circuitry (which may include the at least one memory 1030)), or components, that receives or obtains inputs and processes the inputs to produce, generate, or obtain a set of outputs. The processing system may be configured to perform one or more of the functions described herein. For example, the at least one processor 1040 or a processing system including the at least one processor 1040 may be configured to, configurable to, or operable to cause the device 1005 to perform one or more of the functions described herein. Further, as described herein, being "configured to," being "configurable to," and being "operable to" may be used interchangeably and may be associated with a capability, when executing code stored in the at least one memory 1030 or otherwise, to perform one or more of the functions described herein.

The communications manager 1020 may support wireless communications in accordance with examples as disclosed herein. For example, the communications manager 1020 is capable of, configured to, or operable to support a means for receiving control signaling indicating a set of multiple resource set configurations and at least one reporting configuration, the control signaling indicating that repetition is enabled for at least a first beam for a first resource set and a second beam for a second resource set, the control signaling further requesting for the UE to report a first MI metric associated with the first beam and the second beam. The communications manager 1020 is capable of, configured to, or operable to support a means for monitoring for a first reference signal transmission via the first beam in accordance with a first resource set configuration of the set of multiple resource set configurations. The communications manager 1020 is capable of, configured to, or operable to support a means for monitoring for a second reference signal transmission via the second beam in accordance with the first resource set configuration or a second resource set configuration of the set of multiple resource set configurations. The communications manager 1020 is capable of, configured to, or operable to support a means for transmitting, in accordance with the at least one reporting configuration, a measurement report indicating the first MI metric, the first MI metric based on at least one of a measurement associated with the first reference signal transmission or a measurement associated with the second reference signal transmission.

By including or configuring the communications manager 1020 in accordance with examples as described herein, the device 1005 may support techniques for reporting MI for beam management, which may allow for improved communication reliability, reduced latency, more efficient utilization of communication resources, and improved coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of reporting MI for multi-beam operations as described herein, or the at least one processor 1040 and the at least one memory 1030 may be otherwise configured to, individually or collectively, perform or support such operations.

Figure 11:
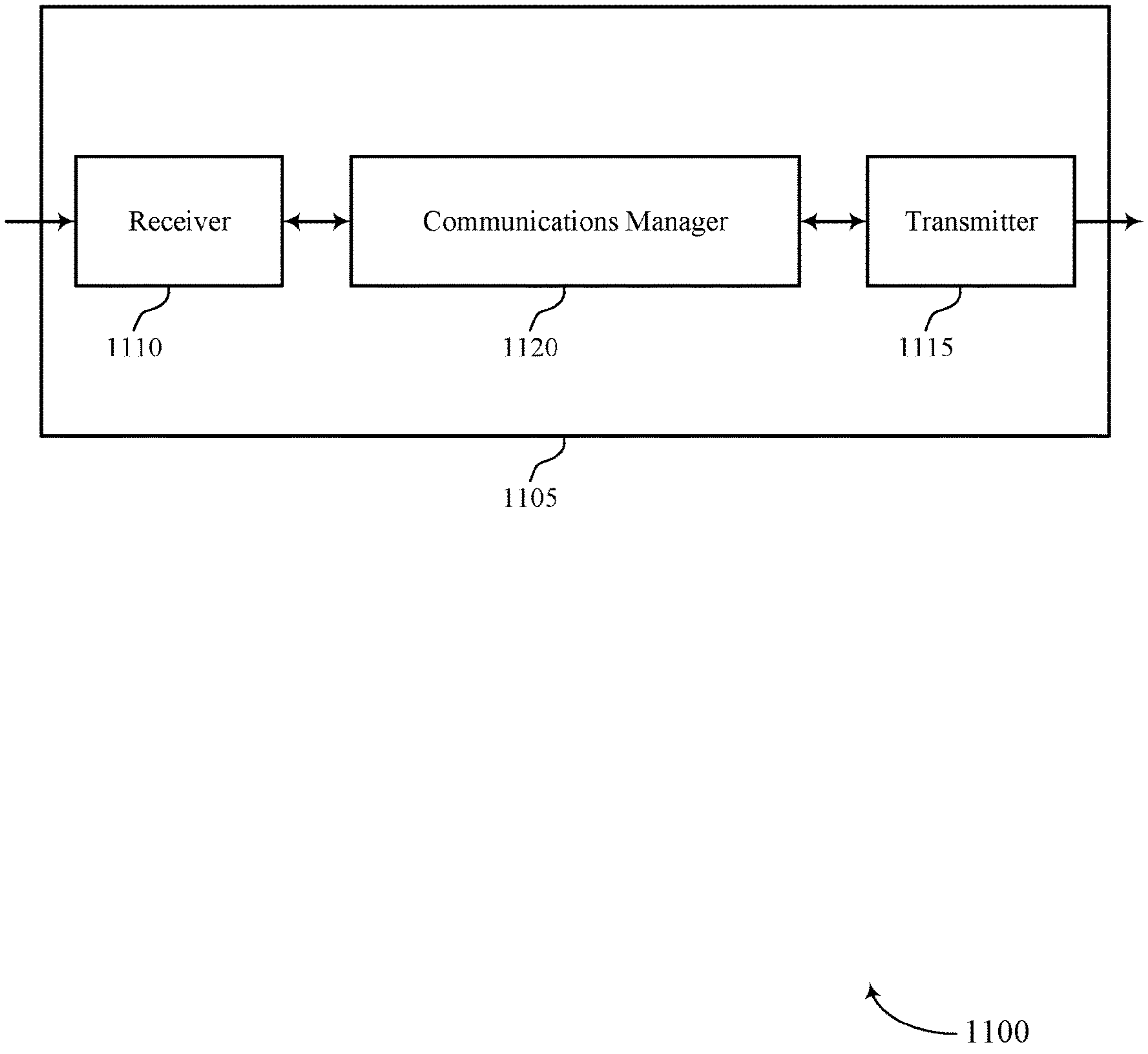
FIGS. 11 and 12 show block diagrams of devices that support reporting MI for multi-beam operations in accordance with one or more aspects of the present disclosure.

FIG. 11 shows a block diagram 1100 of a device 1105 that supports reporting MI for multi-beam operations in accordance with one or more aspects of the present disclosure. The device 1105 may be an example of aspects of a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to, individually or collectively, support or enable the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of reporting MI for multi-beam operations as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor. If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. For example, the communications manager 1120 is capable of, configured to, or operable to support a means for outputting control signaling indicating a set of multiple resource set configurations and at least one reporting configuration, the control signaling indicating that repetition is enabled for at least a first beam of a first resource set and a second beam of a second resource set, the control signaling further requesting for a UE to report a first MI metric associated with the first beam and the second beam. The communications manager 1120 is capable of, configured to, or operable to support a means for outputting a first reference signal transmission via the first beam in accordance with a first resource set configuration of the set of multiple resource set configurations. The communications manager 1120 is capable of, configured to, or operable to support a means for outputting a second reference signal transmission via the second beam in accordance with the first resource set configuration or a second resource set configuration of the set of multiple resource set configurations. The communications manager 1120 is capable of, configured to, or operable to support a means for obtaining, in accordance with the at least one reporting configuration, a measurement report indicating the first MI metric, the first MI metric based on at least one of a measurement associated with the first reference signal transmission or a measurement associated with the second reference signal transmission.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for reporting MI for beam management, which may allow for more efficient utilization of communication resources due to a higher achievable rank of communications.

Figure 12:
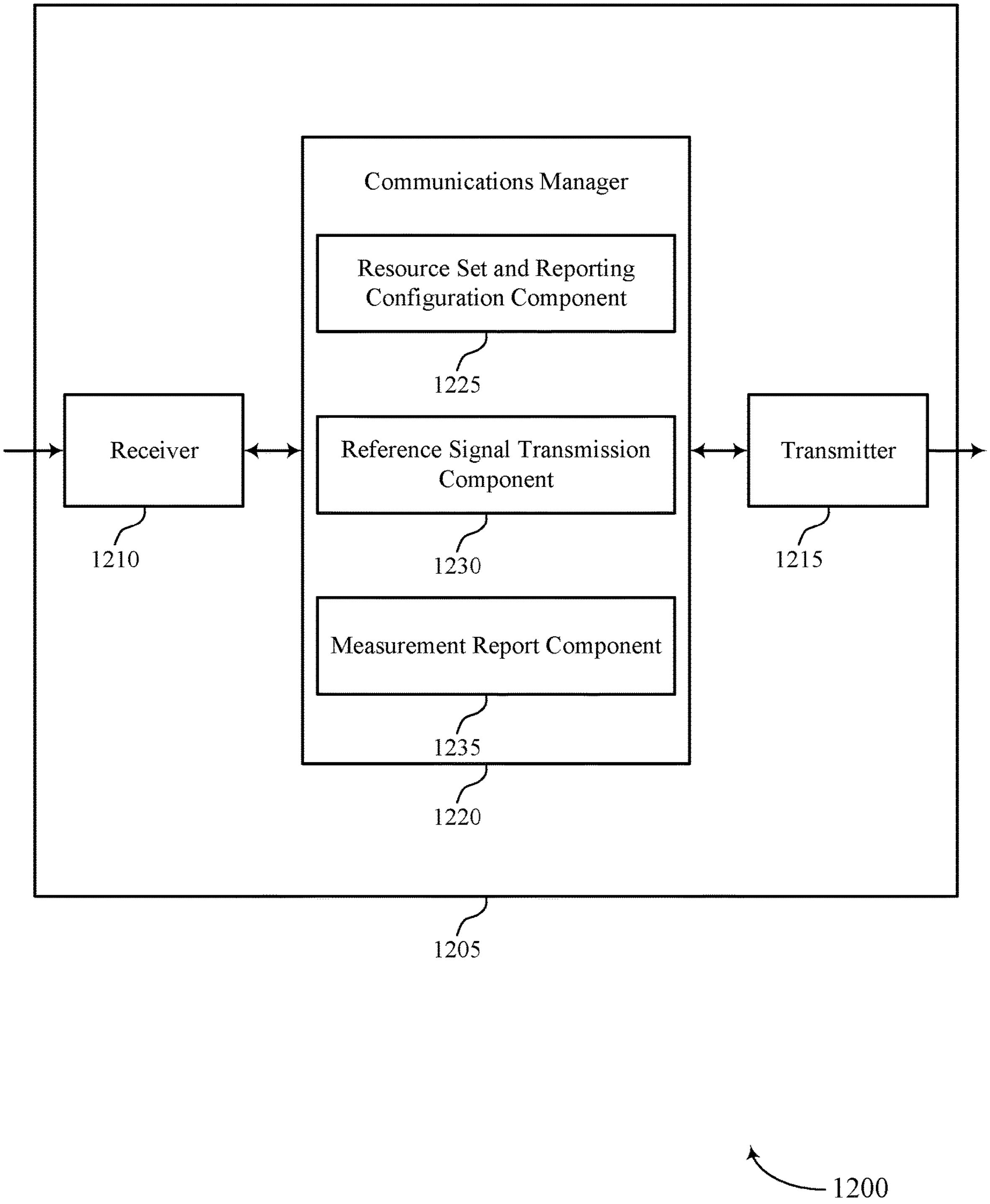

FIG. 12 shows a block diagram 1200 of a device 1205 that supports reporting MI for multi-beam operations in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205, or one or more components of the device 1205 (e.g., the receiver 1210, the transmitter 1215, and the communications manager 1220), may include at least one processor, which may be coupled with at least one memory, to support the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of reporting MI for multi-beam operations as described herein. For example, the communications manager 1220 may include a resource set and reporting configuration component 1225, a reference signal transmission component 1230, a measurement report component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. The resource set and reporting configuration component 1225 is capable of, configured to, or operable to support a means for outputting control signaling indicating a set of multiple resource set configurations and at least one reporting configuration, the control signaling indicating that repetition is enabled for at least a first beam of a first resource set and a second beam of a second resource set, the control signaling further requesting for a UE to report a first MI metric associated with the first beam and the second beam. The reference signal transmission component 1230 is capable of, configured to, or operable to support a means for outputting a first reference signal transmission via the first beam in accordance with a first resource set configuration of the set of multiple resource set configurations. The reference signal transmission component 1230 is capable of, configured to, or operable to support a means for outputting a second reference signal transmission via the second beam in accordance with the first resource set configuration or a second resource set configuration of the set of multiple resource set configurations. The measurement report component 1235 is capable of, configured to, or operable to support a means for obtaining, in accordance with the at least one reporting configuration, a measurement report indicating the first MI metric, the first MI metric based on at least one of a measurement associated with the first reference signal transmission or a measurement associated with the second reference signal transmission.

Figure 13:
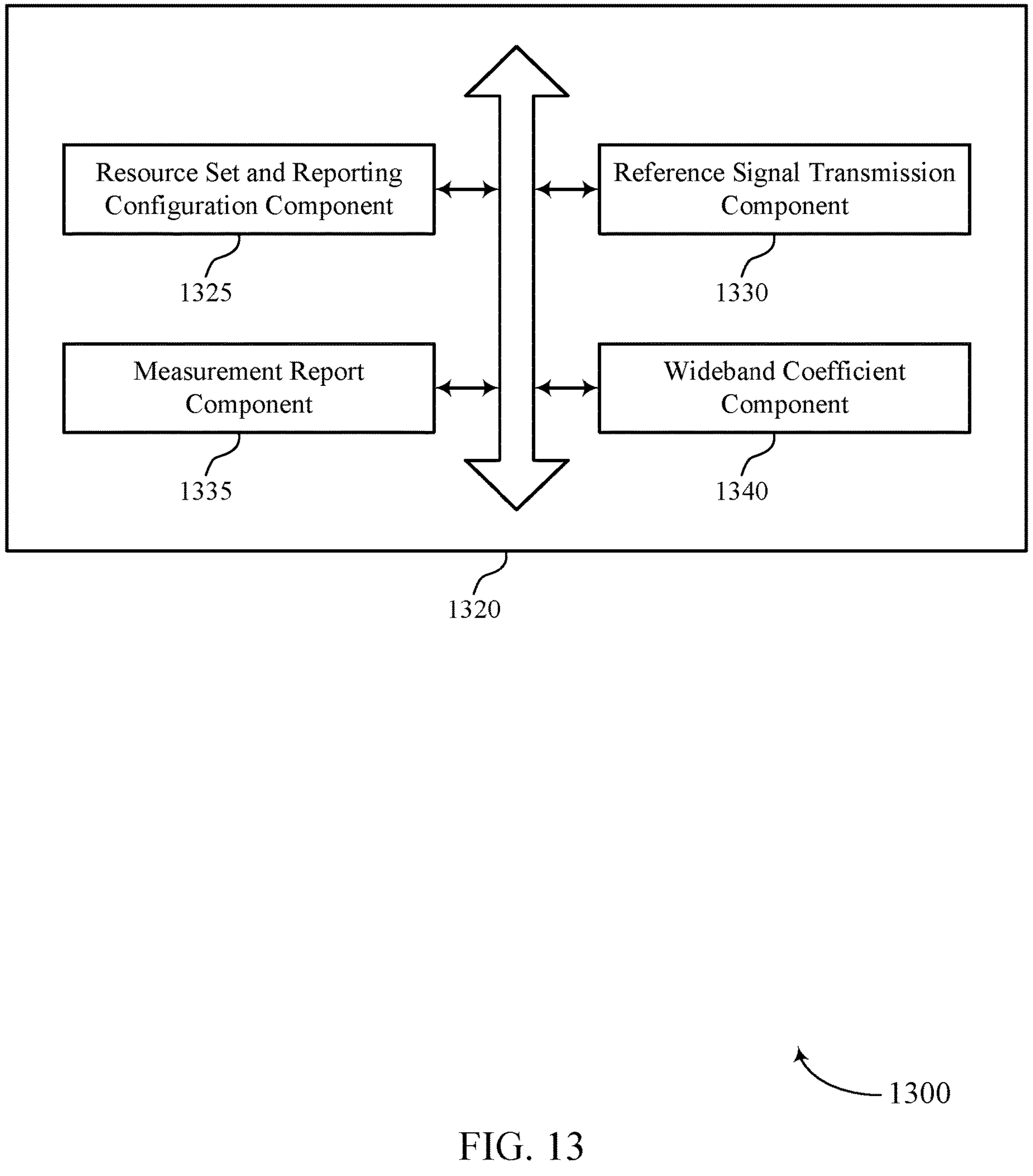
FIG. 13 shows a block diagram of a communications manager that supports reporting MI for multi-beam operations in accordance with one or more aspects of the present disclosure.

FIG. 13 shows a block diagram 1300 of a communications manager 1320 that supports reporting MI for multi-beam operations in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of reporting MI for multi-beam operations as described herein. For example, the communications manager 1320 may include a resource set and reporting configuration component 1325, a reference signal transmission component 1330, a measurement report component 1335, a wideband coefficient component 1340, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications in accordance with examples as disclosed herein. The resource set and reporting configuration component 1325 is capable of, configured to, or operable to support a means for outputting control signaling indicating a set of multiple resource set configurations and at least one reporting configuration, the control signaling indicating that repetition is enabled for at least a first beam of a first resource set and a second beam of a second resource set, the control signaling further requesting for a UE to report a first MI metric associated with the first beam and the second beam. The reference signal transmission component 1330 is capable of, configured to, or operable to support a means for outputting a first reference signal transmission via the first beam in accordance with a first resource set configuration of the set of multiple resource set configurations. In some examples, the reference signal transmission component 1330 is capable of, configured to, or operable to support a means for outputting a second reference signal transmission via the second beam in accordance with the first resource set configuration or a second resource set configuration of the set of multiple resource set configurations. The measurement report component 1335 is capable of, configured to, or operable to support a means for obtaining, in accordance with the at least one reporting configuration, a measurement report indicating the first MI metric, the first MI metric based on at least one of a measurement associated with the first reference signal transmission or a measurement associated with the second reference signal transmission.

In some examples, the measurement report component 1335 is capable of, configured to, or operable to support a means for outputting a request indicating for the UE to transmit the measurement report, where the request indicates a reporting configuration identification associated with one of the at least one reporting configuration.

In some examples, the at least one reporting configuration is a set of multiple reporting configurations. In some examples, each of the set of multiple resource set configurations corresponds to a respective reporting configuration of the at least one reporting configuration. In some examples, the request for the UE to transmit the measurement report indicates a reporting configuration identification associated with one of the at least one reporting configuration.

In some examples, to support obtaining the measurement report, the measurement report component 1335 is capable of, configured to, or operable to support a means for obtaining the measurement report that indicates a first resource set configuration of the set of multiple resource set configurations, the first resource set configuration associated with a preferred beam pair of a set of multiple beam pairs associated with the set of multiple resource set configurations, the preferred beam pair based on the first MI metric or one or more additional MI metrics.

In some examples, to support obtaining the measurement report, the measurement report component 1335 is capable of, configured to, or operable to support a means for obtaining the measurement report that indicates the first MI metric associated with the first resource configuration and that indicates a second MI metric associated with the second resource configuration.

In some examples, the measurement report further indicates a RSRP, the RSRP based on one or more wideband coefficients associated with the first beam, the second beam, or both.

In some examples, the wideband coefficient component 1340 is capable of, configured to, or operable to support a means for outputting control signaling indicating a set of multiple predefined wideband coefficient values for the UE to select from when reporting at least one wideband coefficient associated with the first beam, the second beam, or both, where one or more wideband coefficients indicated in the measurement report include at least a first predefined wideband coefficient value from the set of multiple predefined wideband coefficient values.

In some examples, the resource set and reporting configuration component 1325 is capable of, configured to, or operable to support a means for outputting second control signaling indicating a CSI-RS resource set based on the measurement report. In some examples, the reference signal transmission component 1330 is capable of, configured to, or operable to support a means for outputting one or more CSI-RSs via a resource of the CSI-RS resource set. In some examples, the measurement report component 1335 is capable of, configured to, or operable to support a means for obtaining a CSI-RS report indicating a channel measurement, a CQI, a PMI, or any combination thereof.

In some examples, the first resource set configuration indicates that beam repetition is enabled for transmissions via the first beam for the first resource set and via the second beam for the second resource set.

In some examples, the first resource set configuration indicates that beam repetition is enabled for transmissions via the first beam for the first resource set, and the second resource set configuration indicates that beam repetition is enabled for transmissions via the second beam for the second resource set.

Figure 14:
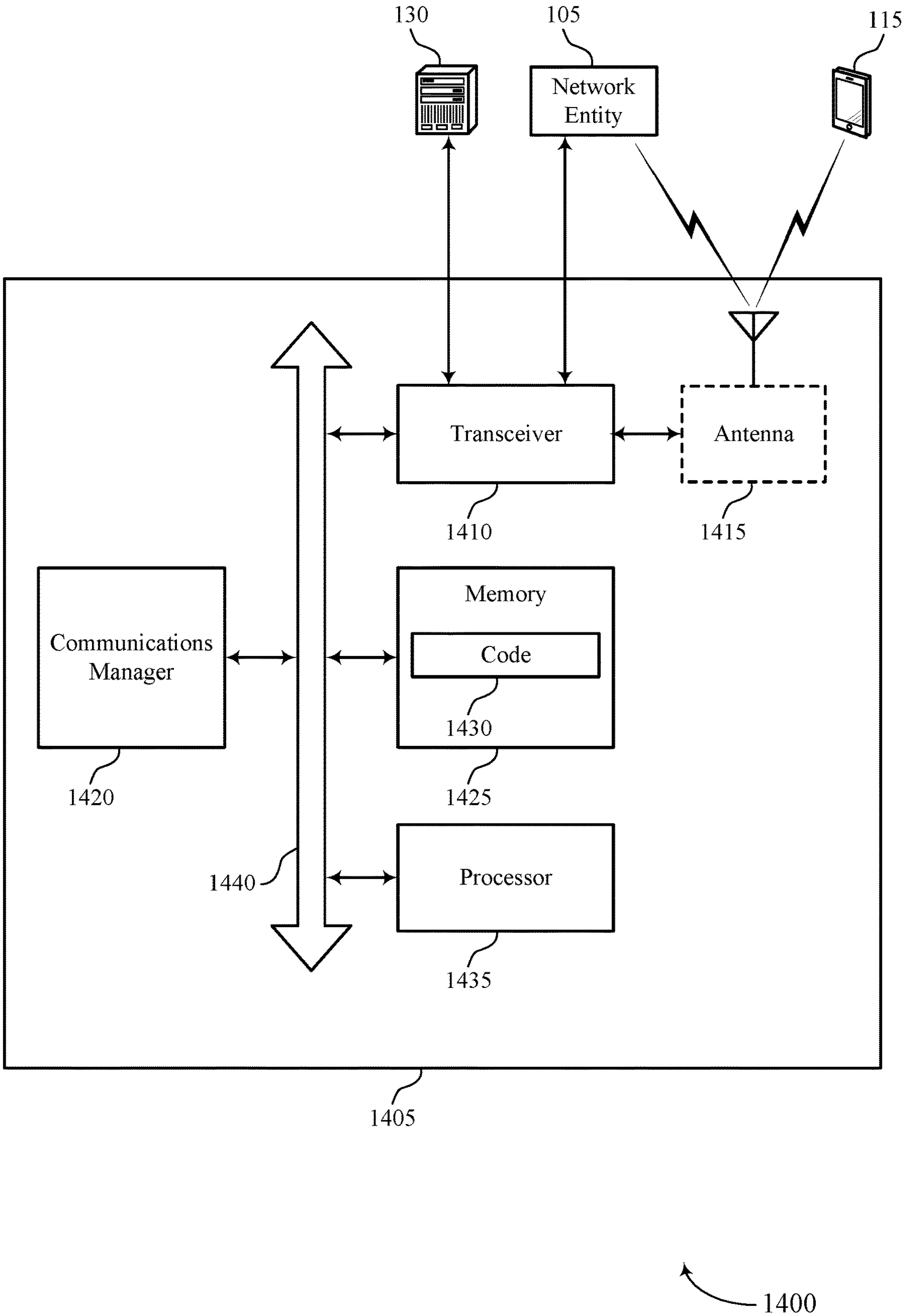
FIG. 14 shows a diagram of a system including a device that supports reporting MI for multi-beam operations in accordance with one or more aspects of the present disclosure.

FIG. 14 shows a diagram of a system 1400 including a device 1405 that supports reporting MI for multi-beam operations in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, at least one memory 1425, code 1430, and at least one processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or one or more memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or one or more memory components (e.g., the at least one processor 1435, the at least one memory 1425, or both), may be included in a chip or chip assembly that is installed in the device 1405. In some examples, the transceiver 1410 may be operable to support communications via one or more communications links (e.g., a communication link 125, a backhaul communication link 120, a midhaul communication link 162, a fronthaul communication link 168).

The at least one memory 1425 may include RAM, ROM, or any combination thereof. The at least one memory 1425 may store computer-readable, computer-executable code 1430 including instructions that, when executed by one or more of the at least one processor 1435, cause the device 1405 to perform various functions described herein. The code 1430 may be stored in a non-transitory computer-readable medium such as system memory or another type of memory. In some cases, the code 1430 may not be directly executable by a processor of the at least one processor 1435 but may cause a computer (e.g., when compiled and executed) to perform functions described herein. In some cases, the at least one memory 1425 may contain, among other things, a BIOS which may control basic hardware or software operation such as the interaction with peripheral components or devices. In some examples, the at least one processor 1435 may include multiple processors and the at least one memory 1425 may include multiple memories. One or more of the multiple processors may be coupled with one or more of the multiple memories which may, individually or collectively, be configured to perform various functions herein (for example, as part of a processing system).

The at least one processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1435 may be configured to operate a memory array using a memory controller. In some other cases, a memory controller may be integrated into one or more of the at least one processor 1435. The at least one processor 1435 may be configured to execute computer-readable instructions stored in a memory (e.g., one or more of the at least one memory 1425) to cause the device 1405 to perform various functions (e.g., functions or tasks supporting reporting MI for multi-beam operations). For example, the device 1405 or a component of the device 1405 may include at least one processor 1435 and at least one memory 1425 coupled with one or more of the at least one processor 1435, the at least one processor 1435 and the at least one memory 1425 configured to perform various functions described herein. The at least one processor 1435 may be an example of a cloud-computing platform (e.g., one or more physical nodes and supporting software such as operating systems, virtual machines, or container instances) that may host the functions (e.g., by executing code 1430) to perform the functions of the device 1405. The at least one processor 1435 may be any one or more suitable processors capable of executing scripts or instructions of one or more software programs stored in the device 1405 (such as within one or more of the at least one memory 1425). In some examples, the at least one processor 1435 may include multiple processors and the at least one memory 1425 may include multiple memories. One or more of the multiple processors may be coupled with one or more of the multiple memories, which may, individually or collectively, be configured to perform various functions herein. In some examples, the at least one processor 1435 may be a component of a processing system, which may refer to a system (such as a series) of machines, circuitry (including, for example, one or both of processor circuitry (which may include the at least one processor 1435) and memory circuitry (which may include the at least one memory 1425)), or components, that receives or obtains inputs and processes the inputs to produce, generate, or obtain a set of outputs. The processing system may be configured to perform one or more of the functions described herein. For example, the at least one processor 1435 or a processing system including the at least one processor 1435 may be configured to, configurable to, or operable to cause the device 1405 to perform one or more of the functions described herein. Further, as described herein, being "configured to," being "configurable to," and being "operable to" may be used interchangeably and may be associated with a capability, when executing code stored in the at least one memory 1425 or otherwise, to perform one or more of the functions described herein.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the at least one memory 1425, the code 1430, and the at least one processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications in accordance with examples as disclosed herein. For example, the communications manager 1420 is capable of, configured to, or operable to support a means for outputting control signaling indicating a set of multiple resource set configurations and at least one reporting configuration, the control signaling indicating that repetition is enabled for at least a first beam of a first resource set and a second beam of a second resource set, the control signaling further requesting for a UE to report a first MI metric associated with the first beam and the second beam. The communications manager 1420 is capable of, configured to, or operable to support a means for outputting a first reference signal transmission via the first beam in accordance with a first resource set configuration of the set of multiple resource set configurations. The communications manager 1420 is capable of, configured to, or operable to support a means for outputting a second reference signal transmission via the second beam in accordance with the first resource set configuration or a second resource set configuration of the set of multiple resource set configurations. The communications manager 1420 is capable of, configured to, or operable to support a means for obtaining, in accordance with the at least one reporting configuration, a measurement report indicating the first MI metric, the first MI metric based on at least one of a measurement associated with the first reference signal transmission or a measurement associated with the second reference signal transmission.

By including or configuring the communications manager 1420 in accordance with examples as described herein, the device 1405 may support techniques for reporting MI for beam management, which may allow for improved communication reliability, reduced latency, more efficient utilization of communication resources, and improved coordination between devices.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, one or more of the at least one processor 1435, one or more of the at least one memory 1425, the code 1430, or any combination thereof (for example, by a processing system including at least a portion of the at least one processor 1435, the at least one memory 1425, the code 1430, or any combination thereof). For example, the code 1430 may include instructions executable by one or more of the at least one processor 1435 to cause the device 1405 to perform various aspects of reporting MI for multi-beam operations as described herein, or the at least one processor 1435 and the at least one memory 1425 may be otherwise configured to, individually or collectively, perform or support such operations.

Figure 15:
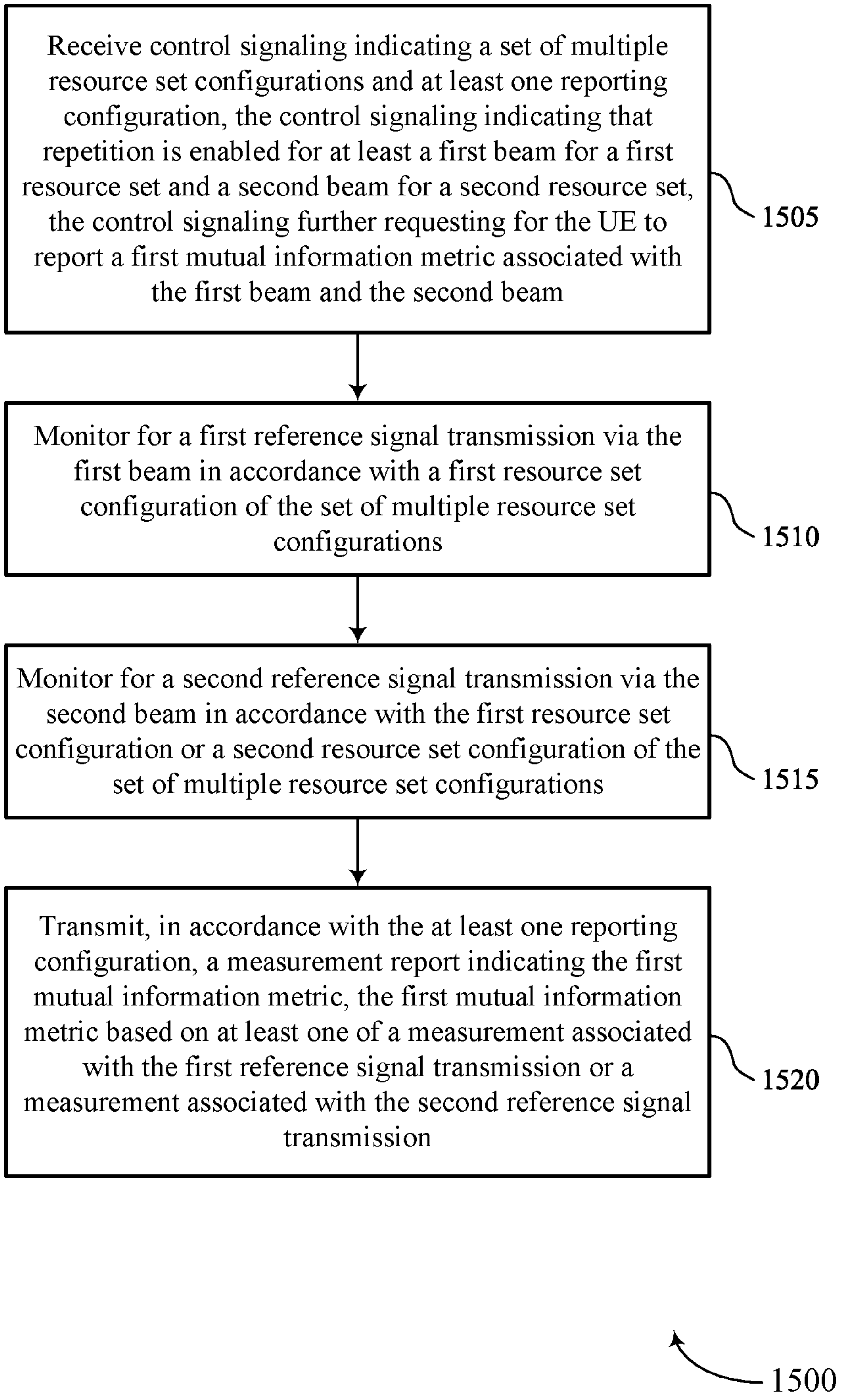
FIGS. 15 through 20 show flowcharts illustrating methods that support reporting MI for multi-beam operations in accordance with one or more aspects of the present disclosure.

FIG. 15 shows a flowchart illustrating a method 1500 that supports reporting MI for multi-beam operations in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving control signaling indicating a set of multiple resource set configurations and at least one reporting configuration, the control signaling indicating that repetition is enabled for at least a first beam for a first resource set and a second beam for a second resource set, the control signaling further requesting for the UE to report a first MI metric associated with the first beam and the second beam. The operations of 1505 may be performed in accordance with examples as disclosed herein. In some examples, aspects of the operations of 1505 may be performed by a resource set and reporting configuration manager 925 as described with reference to FIG. 9.

At 1510, the method may include monitoring for a first reference signal transmission via the first beam in accordance with a first resource set configuration of the set of multiple resource set configurations. The operations of 1510 may be performed in accordance with examples as disclosed herein. In some examples, aspects of the operations of 1510 may be performed by a reference signal monitoring manager 930 as described with reference to FIG. 9.

At 1515, the method may include monitoring for a second reference signal transmission via the second beam in accordance with the first resource set configuration or a second resource set configuration of the set of multiple resource set configurations. The operations of 1515 may be performed in accordance with examples as disclosed herein. In some examples, aspects of the operations of 1515 may be performed by a reference signal monitoring manager 930 as described with reference to FIG. 9.

At 1520, the method may include transmitting, in accordance with the at least one reporting configuration, a measurement report indicating the first MI metric, the first MI metric based on at least one of a measurement associated with the first reference signal transmission or a measurement associated with the second reference signal transmission. The operations of 1520 may be performed in accordance with examples as disclosed herein. In some examples, aspects of the operations of 1520 may be performed by a measurement report manager 935 as described with reference to FIG. 9.

Figure 16:
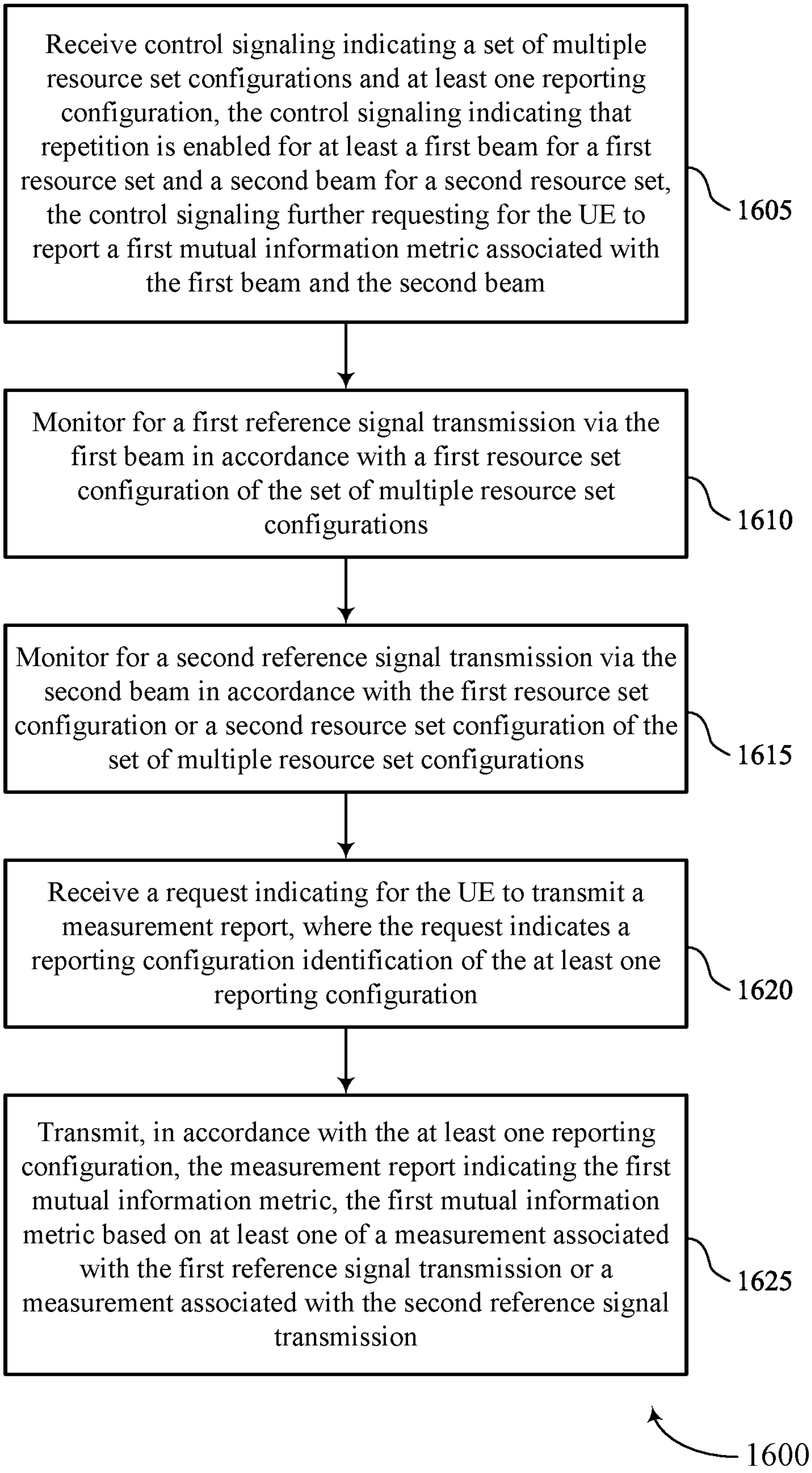

FIG. 16 shows a flowchart illustrating a method 1600 that supports reporting MI for multi-beam operations in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving control signaling indicating a set of multiple resource set configurations and at least one reporting configuration, the control signaling indicating that repetition is enabled for at least a first beam for a first resource set and a second beam for a second resource set, the control signaling further requesting for the UE to report a first MI metric associated with the first beam and the second beam. The operations of 1605 may be performed in accordance with examples as disclosed herein. In some examples, aspects of the operations of 1605 may be performed by a resource set and reporting configuration manager 925 as described with reference to FIG. 9.

At 1610, the method may include monitoring for a first reference signal transmission via the first beam in accordance with a first resource set configuration of the set of multiple resource set configurations. The operations of 1610 may be performed in accordance with examples as disclosed herein. In some examples, aspects of the operations of 1610 may be performed by a reference signal monitoring manager 930 as described with reference to FIG. 9.

At 1615, the method may include monitoring for a second reference signal transmission via the second beam in accordance with the first resource set configuration or a second resource set configuration of the set of multiple resource set configurations. The operations of 1615 may be performed in accordance with examples as disclosed herein. In some examples, aspects of the operations of 1615 may be performed by a reference signal monitoring manager 930 as described with reference to FIG. 9.

At 1620, the method may include receiving a request indicating for the UE to transmit a measurement report, where the request indicates a reporting configuration identification of the at least one reporting configuration. The operations of 1620 may be performed in accordance with examples as disclosed herein. In some examples, aspects of the operations of 1620 may be performed by a measurement report manager 935 as described with reference to FIG. 9.

At 1625, the method may include transmitting, in accordance with the at least one reporting configuration, the measurement report indicating the first MI metric, the first MI metric based on at least one of a measurement associated with the first reference signal transmission or a measurement associated with the second reference signal transmission. The operations of 1625 may be performed in accordance with examples as disclosed herein. In some examples, aspects of the operations of 1625 may be performed by a measurement report manager 935 as described with reference to FIG. 9.

Figure 17:
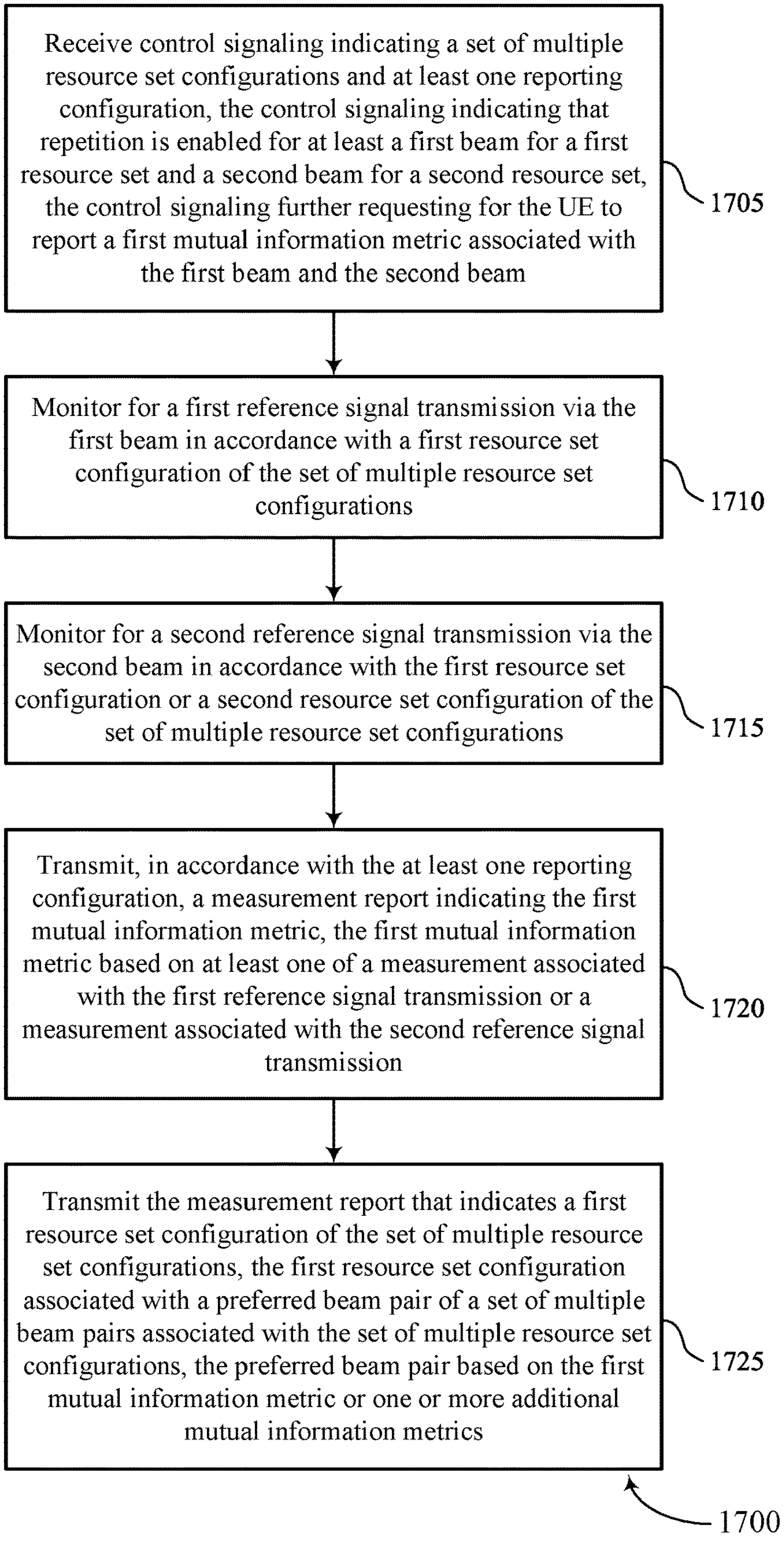

FIG. 17 shows a flowchart illustrating a method 1700 that supports reporting MI for multi-beam operations in accordance with one or more aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving control signaling indicating a set of multiple resource set configurations and at least one reporting configuration, the control signaling indicating that repetition is enabled for at least a first beam for a first resource set and a second beam for a second resource set, the control signaling further requesting for the UE to report a first MI metric associated with the first beam and the second beam. The operations of 1705 may be performed in accordance with examples as disclosed herein. In some examples, aspects of the operations of 1705 may be performed by a resource set and reporting configuration manager 925 as described with reference to FIG. 9.

At 1710, the method may include monitoring for a first reference signal transmission via the first beam in accordance with a first resource set configuration of the set of multiple resource set configurations. The operations of 1710 may be performed in accordance with examples as disclosed herein. In some examples, aspects of the operations of 1710 may be performed by a reference signal monitoring manager 930 as described with reference to FIG. 9.

At 1715, the method may include monitoring for a second reference signal transmission via the second beam in accordance with the first resource set configuration or a second resource set configuration of the set of multiple resource set configurations. The operations of 1715 may be performed in accordance with examples as disclosed herein. In some examples, aspects of the operations of 1715 may be performed by a reference signal monitoring manager 930 as described with reference to FIG. 9.

At 1720, the method may include transmitting, in accordance with the at least one reporting configuration, a measurement report indicating the first MI metric, the first MI metric based on at least one of a measurement associated with the first reference signal transmission or a measurement associated with the second reference signal transmission. The operations of 1720 may be performed in accordance with examples as disclosed herein. In some examples, aspects of the operations of 1720 may be performed by a measurement report manager 935 as described with reference to FIG. 9.

At 1725, the method may include transmitting the measurement report that indicates a first resource set configuration of the set of multiple resource set configurations, the first resource set configuration associated with a preferred beam pair of a set of multiple beam pairs associated with the set of multiple resource set configurations, the preferred beam pair based on the first MI metric or one or more additional MI metrics. The operations of 1725 may be performed in accordance with examples as disclosed herein. In some examples, aspects of the operations of 1725 may be performed by a measurement report manager 935 as described with reference to FIG. 9.

Figure 18:
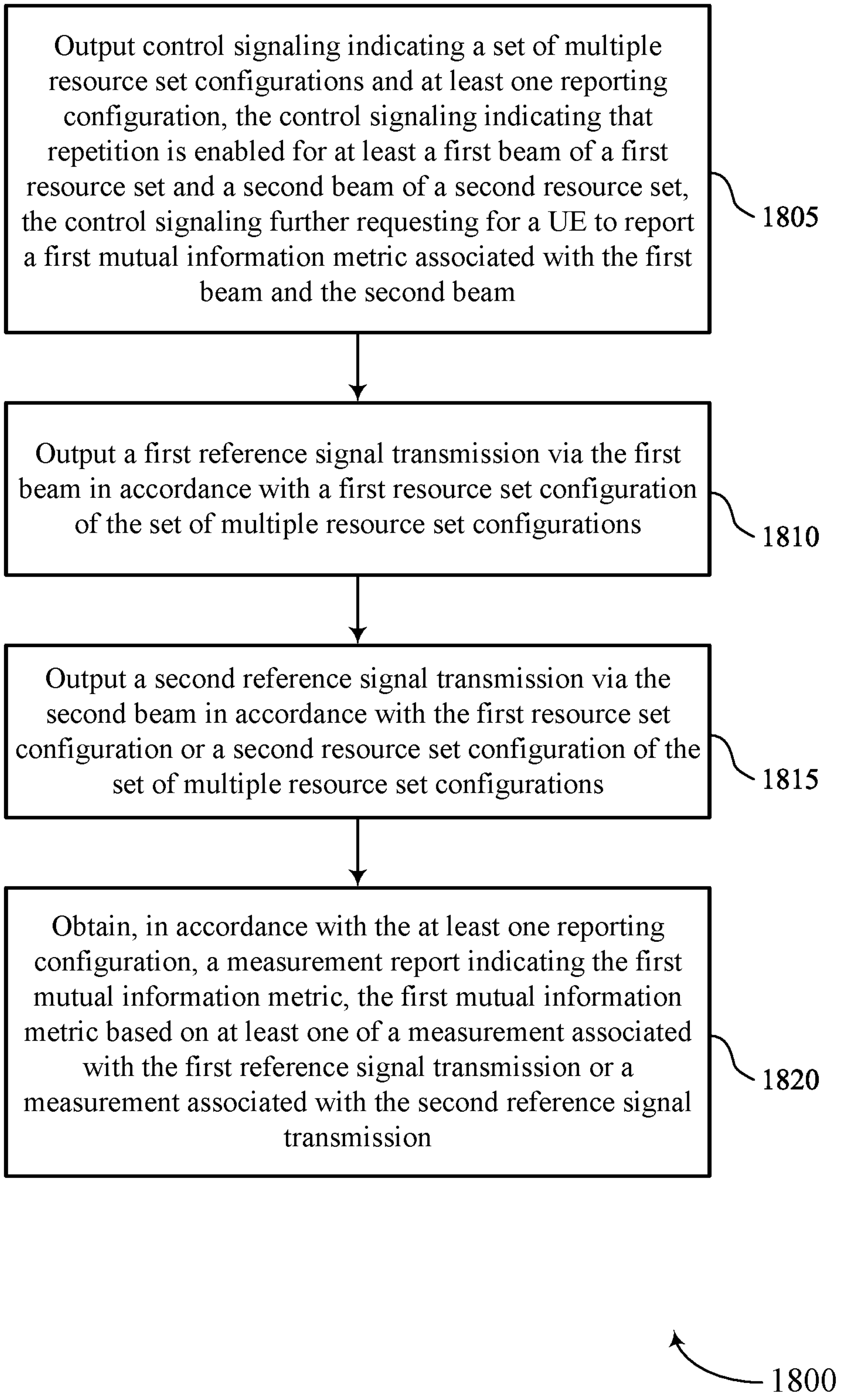

FIG. 18 shows a flowchart illustrating a method 1800 that supports reporting MI for multi-beam operations in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include outputting control signaling indicating a set of multiple resource set configurations and at least one reporting configuration, the control signaling indicating that repetition is enabled for at least a first beam of a first resource set and a second beam of a second resource set, the control signaling further requesting for a UE to report a first MI metric associated with the first beam and the second beam. The operations of 1805 may be performed in accordance with examples as disclosed herein. In some examples, aspects of the operations of 1805 may be performed by a resource set and reporting configuration component 1325 as described with reference to FIG. 13.

At 1810, the method may include outputting a first reference signal transmission via the first beam in accordance with a first resource set configuration of the set of multiple resource set configurations. The operations of 1810 may be performed in accordance with examples as disclosed herein. In some examples, aspects of the operations of 1810 may be performed by a reference signal transmission component 1330 as described with reference to FIG. 13.

At 1815, the method may include outputting a second reference signal transmission via the second beam in accordance with the first resource set configuration or a second resource set configuration of the set of multiple resource set configurations. The operations of 1815 may be performed in accordance with examples as disclosed herein. In some examples, aspects of the operations of 1815 may be performed by a reference signal transmission component 1330 as described with reference to FIG. 13.

At 1820, the method may include obtaining, in accordance with the at least one reporting configuration, a measurement report indicating the first MI metric, the first MI metric based on at least one of a measurement associated with the first reference signal transmission or a measurement associated with the second reference signal transmission. The operations of 1820 may be performed in accordance with examples as disclosed herein. In some examples, aspects of the operations of 1820 may be performed by a measurement report component 1335 as described with reference to FIG. 13.

Figure 19:
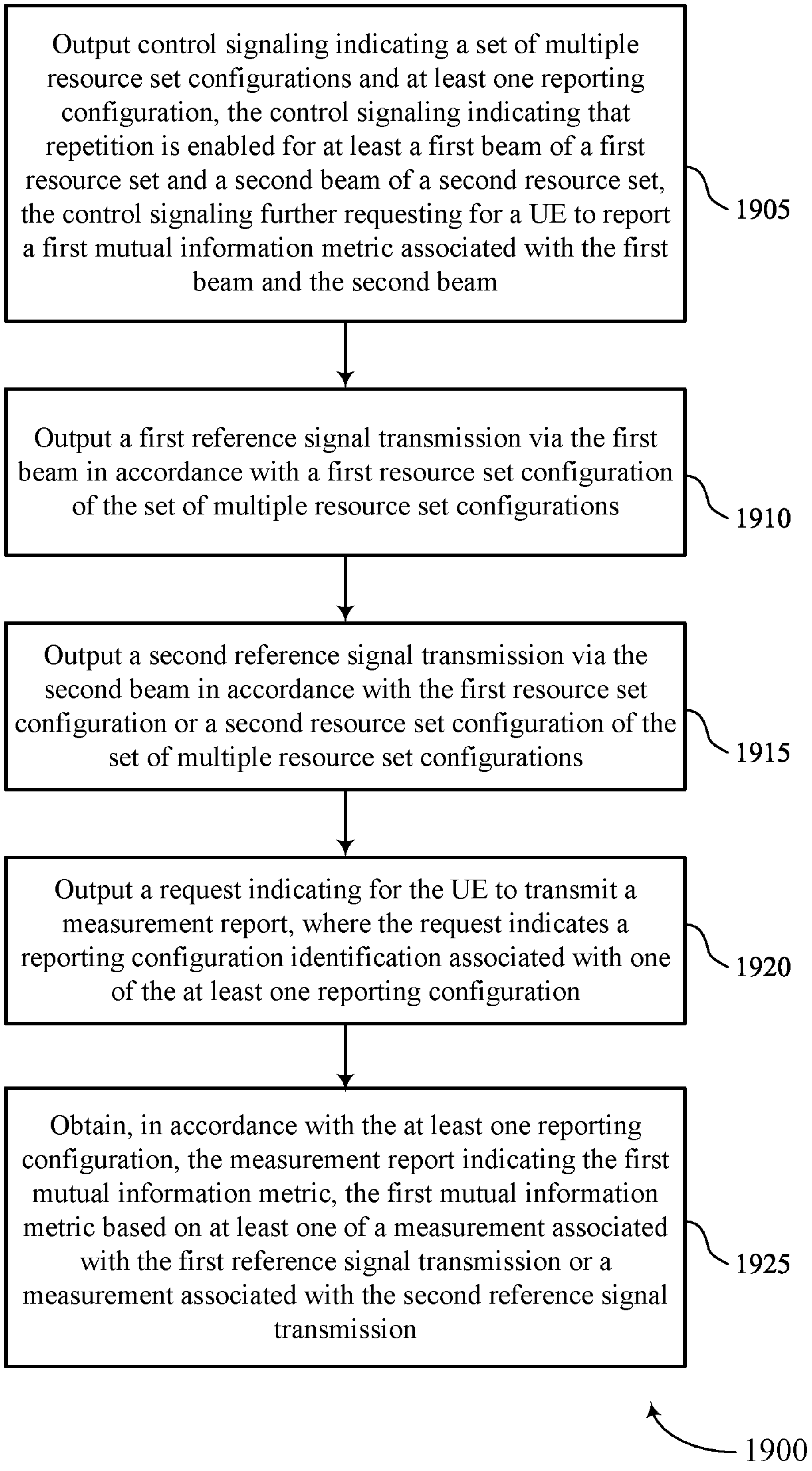

FIG. 19 shows a flowchart illustrating a method 1900 that supports reporting MI for multi-beam operations in accordance with one or more aspects of the present disclosure. The operations of the method 1900 may be implemented by a network entity or its components as described herein. For example, the operations of the method 1900 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1905, the method may include outputting control signaling indicating a set of multiple resource set configurations and at least one reporting configuration, the control signaling indicating that repetition is enabled for at least a first beam of a first resource set and a second beam of a second resource set, the control signaling further requesting for a UE to report a first MI metric associated with the first beam and the second beam. The operations of 1905 may be performed in accordance with examples as disclosed herein. In some examples, aspects of the operations of 1905 may be performed by a resource set and reporting configuration component 1325 as described with reference to FIG. 13.

At 1910, the method may include outputting a first reference signal transmission via the first beam in accordance with a first resource set configuration of the set of multiple resource set configurations. The operations of 1910 may be performed in accordance with examples as disclosed herein. In some examples, aspects of the operations of 1910 may be performed by a reference signal transmission component 1330 as described with reference to FIG. 13.

At 1915, the method may include outputting a second reference signal transmission via the second beam in accordance with the first resource set configuration or a second resource set configuration of the set of multiple resource set configurations. The operations of 1915 may be performed in accordance with examples as disclosed herein. In some examples, aspects of the operations of 1915 may be performed by a reference signal transmission component 1330 as described with reference to FIG. 13.

At 1920, the method may include outputting a request indicating for the UE to transmit a measurement report, where the request indicates a reporting configuration identification associated with one of the at least one reporting configuration. The operations of 1920 may be performed in accordance with examples as disclosed herein. In some examples, aspects of the operations of 1920 may be performed by a measurement report component 1335 as described with reference to FIG. 13.

At 1925, the method may include obtaining, in accordance with the at least one reporting configuration, the measurement report indicating the first MI metric, the first MI metric based on at least one of a measurement associated with the first reference signal transmission or a measurement associated with the second reference signal transmission. The operations of 1925 may be performed in accordance with examples as disclosed herein. In some examples, aspects of the operations of 1925 may be performed by a measurement report component 1335 as described with reference to FIG. 13.

Figure 20:
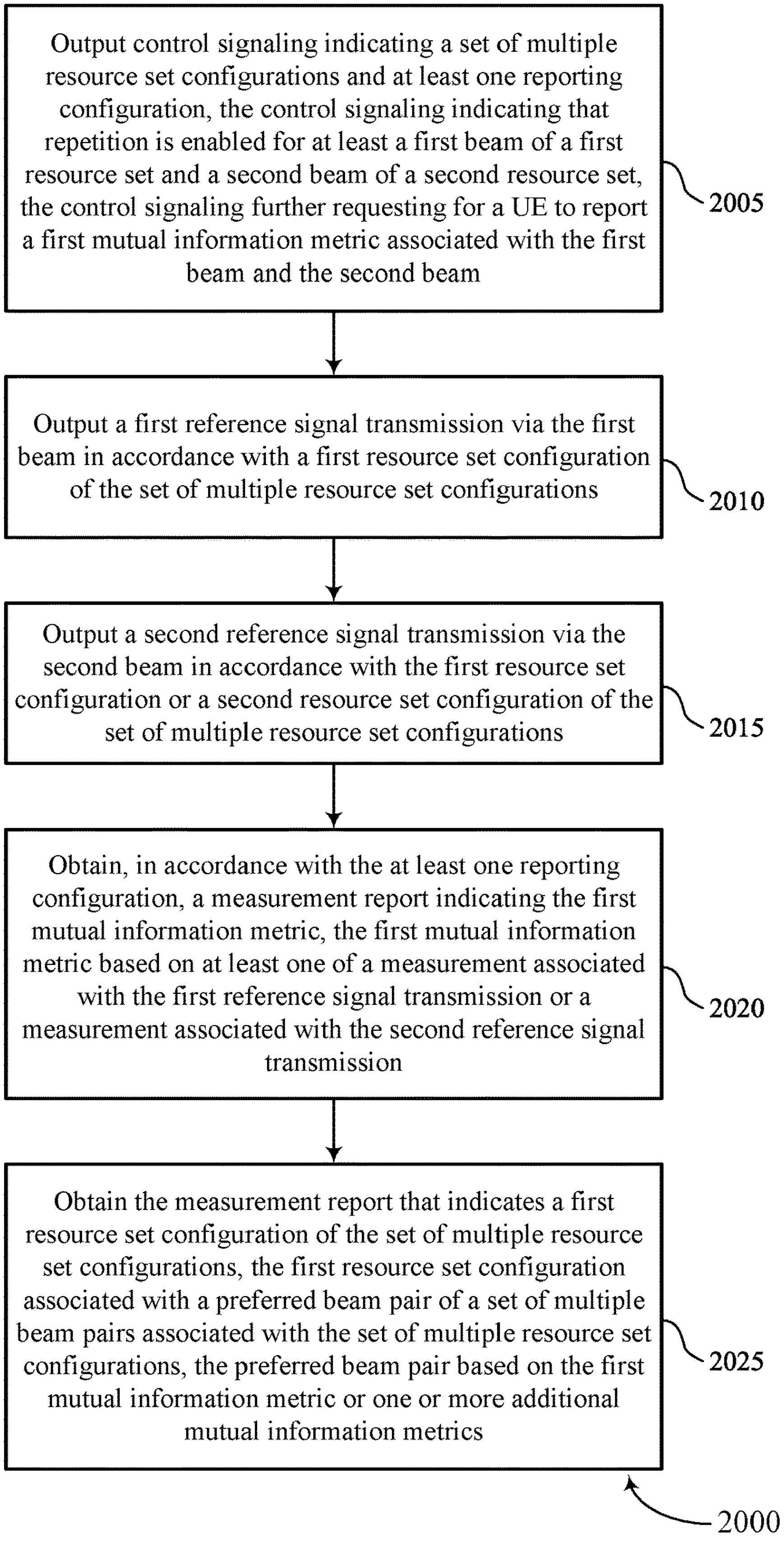

FIG. 20 shows a flowchart illustrating a method 2000 that supports reporting MI for multi-beam operations in accordance with one or more aspects of the present disclosure. The operations of the method 2000 may be implemented by a network entity or its components as described herein. For example, the operations of the method 2000 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2005, the method may include outputting control signaling indicating a set of multiple resource set configurations and at least one reporting configuration, the control signaling indicating that repetition is enabled for at least a first beam of a first resource set and a second beam of a second resource set, the control signaling further requesting for a UE to report a first MI metric associated with the first beam and the second beam. The operations of 2005 may be performed in accordance with examples as disclosed herein. In some examples, aspects of the operations of 2005 may be performed by a resource set and reporting configuration component 1325 as described with reference to FIG. 13.

At 2010, the method may include outputting a first reference signal transmission via the first beam in accordance with a first resource set configuration of the set of multiple resource set configurations. The operations of 2010 may be performed in accordance with examples as disclosed herein. In some examples, aspects of the operations of 2010 may be performed by a reference signal transmission component 1330 as described with reference to FIG. 13.

At 2015, the method may include outputting a second reference signal transmission via the second beam in accordance with the first resource set configuration or a second resource set configuration of the set of multiple resource set configurations. The operations of 2015 may be performed in accordance with examples as disclosed herein. In some examples, aspects of the operations of 2015 may be performed by a reference signal transmission component 1330 as described with reference to FIG. 13.

At 2020, the method may include obtaining, in accordance with the at least one reporting configuration, a measurement report indicating the first MI metric, the first MI metric based on at least one of a measurement associated with the first reference signal transmission or a measurement associated with the second reference signal transmission. The operations of 2020 may be performed in accordance with examples as disclosed herein. In some examples, aspects of the operations of 2020 may be performed by a measurement report component 1335 as described with reference to FIG. 13.

At 2025, the method may include obtaining the measurement report that indicates a first resource set configuration of the set of multiple resource set configurations, the first resource set configuration associated with a preferred beam pair of a set of multiple beam pairs associated with the set of multiple resource set configurations, the preferred beam pair based on the first MI metric or one or more additional MI metrics. The operations of 2025 may be performed in accordance with examples as disclosed herein. In some examples, aspects of the operations of 2025 may be performed by a measurement report component 1335 as described with reference to FIG. 13.

The following provides an overview of aspects of the present disclosure:

Aspect 1: A method for wireless communications by a UE, comprising: receiving control signaling indicating a plurality of resource set configurations and at least one reporting configuration, the control signaling indicating that repetition is enabled for at least a first beam for a first resource set and a second beam for a second resource set, the control signaling further requesting for the UE to report a first MI metric associated with the first beam and the second beam; monitoring for a first reference signal transmission via the first beam in accordance with a first resource set configuration of the plurality of resource set configurations; monitoring for a second reference signal transmission via the second beam in accordance with the first resource set configuration or a second resource set configuration of the plurality of resource set configurations; and transmitting, in accordance with the at least one reporting configuration, a measurement report indicating the first MI metric, the first MI metric based at least in part on at least one of a measurement associated with the first reference signal transmission or a measurement associated with the second reference signal transmission.

Aspect 2: The method of aspect 1, further comprising: receiving a request indicating for the UE to transmit the measurement report, wherein the request indicates a reporting configuration identification of the at least one reporting configuration.

Aspect 3: The method of aspect 2, wherein the at least one reporting configuration is a plurality of reporting configurations, each of the plurality of resource set configurations corresponds to a respective reporting configuration of the plurality of reporting configurations, and the request for the UE to transmit the measurement report indicates to use a first reporting configuration of the plurality of reporting configurations.

Aspect 4: The method of any of aspects 1 through 2, wherein the at least one reporting configuration is a single reporting configuration, and wherein transmitting the measurement report further comprises: transmitting the measurement report that indicates a first resource set configuration of the plurality of resource set configurations, the first resource set configuration associated with a preferred beam pair of a plurality of beam pairs associated with the plurality of resource set configurations, the preferred beam pair based at least in part on the first MI metric or one or more additional MI metrics.

Aspect 5: The method of any of aspects 1 through 2, wherein the plurality of resource set configurations comprises a first resource configuration and a second resource configuration and wherein the at least one reporting configuration is a single reporting configuration, and wherein transmitting the measurement report further comprises: transmitting the measurement report that indicates the first MI metric associated with the first resource configuration and that indicates a second MI metric associated with the second resource configuration.

Aspect 6: The method of any of aspects 1 through 5, wherein the measurement report further indicates a reference signal received power, the reference signal received power based at least in part on one or more wideband coefficients associated with the first beam, the second beam, or both.

Aspect 7: The method of any of aspects 1 through 6, further comprising: receiving control signaling indicating a plurality of predefined wideband coefficient values for the UE to select from when reporting at least one wideband coefficient associated with the first beam, the second beam, or both, wherein one or more wideband coefficients indicated in the measurement report comprise at least a first predefined wideband coefficient value from the plurality of predefined wideband coefficient values.

Aspect 8: The method of aspect 7, further comprising: receiving control signaling indicating for the UE to report the one or more wideband coefficients.

Aspect 9: The method of any of aspects 1 through 8, further comprising: transmitting a second measurement report indicating one or more channel state information parameters, the one or more channel state information parameters comprising a channel quality indicator, a precoding matrix indicator, a rank indicator, or any combination thereof, associated with the first beam and the second beam.

Aspect 10: The method of any of aspects 1 through 9, further comprising: receiving second control signaling indicating a CSI-RS resource set based at least in part on the measurement report; receiving one or more CSI-RSs via a resource of the CSI-RS resource set; and transmitting a CSI-RS report indicating a channel measurement, a channel quality indicator, a precoding matrix indicator, or any combination thereof.

Aspect 11: The method of any of aspects 1 through 10, wherein the first resource set configuration indicates that beam repetition is enabled for transmissions via the first beam for the first resource set, and via the second beam for the second resource set.

Aspect 12: The method of any of aspects 1 through 11, wherein the first resource set configuration indicates that beam repetition is enabled for transmissions via the first beam for the first resource set and the second resource set configuration indicates that beam repetition is enabled for transmissions via the second beam for the second resource set.

Aspect 13: The method of any of aspects 1 through 12, wherein monitoring for the second reference signal transmission comprises: monitoring for the second reference signal transmission via the second beam in accordance with the first resource set configuration.

Aspect 14: The method of any of aspects 1 through 12, wherein monitoring for the second reference signal transmission comprises: monitoring for the second reference signal transmission via the second beam in accordance with the second resource set configuration.

Aspect 15: A method for wireless communications by a network entity, comprising: outputting control signaling indicating a plurality of resource set configurations and at least one reporting configuration, the control signaling indicating that repetition is enabled for at least a first beam of a first resource set and a second beam of a second resource set, the control signaling further requesting for a UE to report a first MI metric associated with the first beam and the second beam; outputting a first reference signal transmission via the first beam in accordance with a first resource set configuration of the plurality of resource set configurations; outputting a second reference signal transmission via the second beam in accordance with the first resource set configuration or a second resource set configuration of the plurality of resource set configurations; and obtaining, in accordance with the at least one reporting configuration, a measurement report indicating the first MI metric, the first MI metric based at least in part on at least one of a measurement associated with the first reference signal transmission or a measurement associated with the second reference signal transmission.

Aspect 16: The method of aspect 15, further comprising: outputting a request indicating for the UE to transmit the measurement report, wherein the request indicates a reporting configuration identification associated with one of the at least one reporting configuration.

Aspect 17: The method of aspect 16, wherein the at least one reporting configuration is a plurality of reporting configurations, each of the plurality of resource set configurations corresponds to a respective reporting configuration of the at least one reporting configuration, and the request for the UE to transmit the measurement report indicates a reporting configuration identification associated with one of the at least one reporting configuration.

Aspect 18: The method of any of aspects 15 through 16, wherein the at least one reporting configuration comprises a single reporting configuration, and wherein obtaining the measurement report further comprises: obtaining the measurement report that indicates a first resource set configuration of the plurality of resource set configurations, the first resource set configuration associated with a preferred beam pair of a plurality of beam pairs associated with the plurality of resource set configurations, the preferred beam pair based at least in part on the first MI metric or one or more additional MI metrics.

Aspect 19: The method of any of aspects 15 through 16, wherein the plurality of resource set configurations comprises a first resource configuration and a second resource configuration and wherein the at least one reporting configuration comprises a single reporting configuration, and wherein obtaining the measurement report further comprises: obtaining the measurement report that indicates the first MI metric associated with the first resource configuration and that indicates a second MI metric associated with the second resource configuration.

Aspect 20: The method of any of aspects 15 through 19, wherein the measurement report further indicates a reference signal received power, the reference signal received power based at least in part on one or more wideband coefficients associated with the first beam, the second beam, or both.

Aspect 21: The method of any of aspects 15 through 20, further comprising: outputting control signaling indicating a plurality of predefined wideband coefficient values for the UE to select from when reporting at least one wideband coefficient associated with the first beam, the second beam, or both, wherein one or more wideband coefficients indicated in the measurement report comprise at least a first predefined wideband coefficient value from the plurality of predefined wideband coefficient values.

Aspect 22: The method of any of aspects 15 through 21, further comprising: outputting second control signaling indicating a CSI-RS resource set based at least in part on the measurement report; outputting one or more CSI-RSs via a resource of the CSI-RS resource set; and obtaining a CSI-RS report indicating a channel measurement, a channel quality indicator, a precoding matrix indicator, or any combination thereof.

Aspect 23: The method of any of aspects 15 through 22, wherein the first resource set configuration indicates that beam repetition is enabled for transmissions via the first beam for the first resource set and via the second beam for the second resource set.

Aspect 24: The method of any of aspects 15 through 23, wherein the first resource set configuration indicates that beam repetition is enabled for transmissions via the first beam for the first resource set, and the second resource set configuration indicates that beam repetition is enabled for transmissions via the second beam for the second resource set.

Aspect 25: A UE for wireless communications, comprising one or more memories storing processor-executable code, and one or more processors coupled with the one or more memories and individually or collectively operable to execute the code to cause the UE to perform a method of any of aspects 1 through 12.

Aspect 26: A UE for wireless communications, comprising at least one means for performing a method of any of aspects 1 through 12.

Aspect 27: A non-transitory computer-readable medium storing code for wireless communications, the code comprising instructions executable by one or more processors to perform a method of any of aspects 1 through 12.

Aspect 28: A network entity for wireless communications, comprising one or more memories storing processor-executable code, and one or more processors coupled with the one or more memories and individually or collectively operable to execute the code to cause the network entity to perform a method of any of aspects 15 through 24.

Aspect 29: A network entity for wireless communications, comprising at least one means for performing a method of any of aspects 15 through 24.

Aspect 30: A non-transitory computer-readable medium storing code for wireless communications, the code comprising instructions executable by one or more processors to perform a method of any of aspects 15 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive control signaling indicating a plurality of resource set configurations and at least one reporting configuration, the control signaling indicating that repetition is enabled for at least a first beam for a first resource set and a second beam for a second resource set, the control signaling further requesting for the UE to report a first mutual information metric associated with the first beam and the second beam;

monitor for a first reference signal transmission via the first beam in accordance with a first resource set configuration of the plurality of resource set configurations;

monitor for a second reference signal transmission via the second beam in accordance with the first resource set configuration or a second resource set configuration of the plurality of resource set configurations; and transmit, in accordance with the at least one reporting configuration, a measurement report indicating the first mutual information metric, the first mutual information metric based at least in part on at least one of a measurement associated with the first reference signal transmission or a measurement associated with the second reference signal transmission.

2. The UE of claim 1, wherein the one or more processors are individually or collectively further operable to execute the code to cause the UE to:

receive a request indicating for the UE to transmit the measurement report, wherein the request indicates a reporting configuration identification of the at least one reporting configuration.

3. The UE of claim 2, wherein the at least one reporting configuration is a plurality of reporting configurations, wherein each of the plurality of resource set configurations corresponds to a respective reporting configuration of the plurality of reporting configurations, and wherein the request for the UE to transmit the measurement report indicates to use a first reporting configuration of the plurality of reporting configurations.

4. The UE of claim 1, wherein, to transmit the measurement report, the one or more processors are individually or collectively further operable to execute the code to cause the UE to:

transmit the measurement report that indicates a first resource set configuration of the plurality of resource set configurations, the first resource set configuration associated with a preferred beam pair of a plurality of beam pairs associated with the plurality of resource set configurations, the preferred beam pair based at least in part on the first mutual information metric or one or more additional mutual information metrics.

5. The UE of claim 1, wherein, to transmit the measurement report, the one or more processors are individually or collectively further operable to execute the code to cause the UE to:

transmit the measurement report that indicates the first mutual information metric associated with the first resource set configuration and that indicates a second mutual information metric associated with the second resource set configuration.

6. The UE of claim 1, wherein the measurement report further indicates a reference signal received power, the reference signal received power based at least in part on one or more wideband coefficients associated with the first beam, the second beam, or both.

7. The UE of claim 1, wherein the one or more processors are individually or collectively further operable to execute the code to cause the UE to:

receive control signaling indicating a plurality of predefined wideband coefficient values for the UE to select from when reporting at least one wideband coefficient associated with the first beam, the second beam, or both, wherein one or more wideband coefficients indicated in the measurement report comprise at least a first predefined wideband coefficient value from the plurality of predefined wideband coefficient values.

8. The UE of claim 7, wherein the one or more processors are individually or collectively further operable to execute the code to cause the UE to:

receive control signaling indicating for the UE to report the one or more wideband coefficients.

9. The UE of claim 1, wherein the one or more processors are individually or collectively further operable to execute the code to cause the UE to:

transmit a second measurement report indicating one or more channel state information parameters, the one or more channel state information parameters comprising a channel quality indicator, a precoding matrix indicator, a rank indicator, or any combination thereof, associated with the first beam and the second beam.

10. The UE of claim 1, wherein the one or more processors are individually or collectively further operable to execute the code to cause the UE to:

receive second control signaling indicating a channel state information reference signal resource set based at least in part on the measurement report;

receive one or more channel state information reference signals via a resource of the channel state information reference signal resource set; and transmit a channel state information reference signal report indicating a channel measurement, a channel quality indicator, a precoding matrix indicator, or any combination thereof.

11. The UE of claim 1, wherein the first resource set configuration indicates that beam repetition is enabled for transmissions via the first beam for the first resource set, and via the second beam for the second resource set.

12. The UE of claim 1, wherein the first resource set configuration indicates that beam repetition is enabled for transmissions via the first beam for the first resource set and the second resource set configuration indicates that beam repetition is enabled for transmissions via the second beam for the second resource set.

13. The UE of claim 1, wherein, to monitor for the second reference signal transmission, the one or more processors are individually or collectively further operable to execute the code to cause the UE to:

monitor for the second reference signal transmission via the second beam in accordance with the first resource set configuration.

14. The UE of claim 1, wherein, to monitor for the second reference signal transmission, the one or more processors are individually or collectively further operable to execute the code to cause the UE to:

monitor for the second reference signal transmission via the second beam in accordance with the second resource set configuration.

15. A network entity, comprising:

one or more memories storing processor-executable code; and one or more processors coupled with the one or more memories and individually or collectively operable to execute the code to cause the network entity to:

output control signaling indicating a plurality of resource set configurations and at least one reporting configuration, the control signaling indicating that repetition is enabled for at least a first beam of a first resource set and a second beam of a second resource set, the control signaling further requesting for a user equipment (UE) to report a first mutual information metric associated with the first beam and the second beam;

output a first reference signal transmission via the first beam in accordance with a first resource set configuration of the plurality of resource set configurations;

output a second reference signal transmission via the second beam in accordance with the first resource set configuration or a second resource set configuration of the plurality of resource set configurations; and obtain, in accordance with the at least one reporting configuration, a measurement report indicating the first mutual information metric, the first mutual information metric based at least in part on at least one of a measurement associated with the first reference signal transmission or a measurement associated with the second reference signal transmission.

16. The network entity of claim 15, wherein the one or more processors are individually or collectively further operable to execute the code to cause the network entity to:

output a request indicating for the UE to transmit the measurement report, wherein the request indicates a reporting configuration identification associated with one of the at least one reporting configuration.

17. The network entity of claim 15, wherein, to obtain the measurement report, the one or more processors are individually or collectively further operable to execute the code to cause the network entity to:

obtain the measurement report that indicates a first resource set configuration of the plurality of resource set configurations, the first resource set configuration associated with a preferred beam pair of a plurality of beam pairs associated with the plurality of resource set configurations, the preferred beam pair based at least in part on the first mutual information metric or one or more additional mutual information metrics.

18. The network entity of claim 15, wherein, to obtain the measurement report, the one or more processors are individually or collectively further operable to execute the code to cause the network entity to:

obtain the measurement report that indicates the first mutual information metric associated with the first resource set configuration and that indicates a second mutual information metric associated with the second resource set configuration.

19. The network entity of claim 15, wherein the one or more processors are individually or collectively further operable to execute the code to cause the network entity to:

output control signaling indicating a plurality of predefined wideband coefficient values for the UE to select from when reporting at least one wideband coefficient associated with the first beam, the second beam, or both, wherein one or more wideband coefficients indicated in the measurement report comprise at least a first predefined wideband coefficient value from the plurality of predefined wideband coefficient values.

20. A method for wireless communications by a user equipment (UE), comprising:

receiving control signaling indicating a plurality of resource set configurations and at least one reporting configuration, the control signaling indicating that repetition is enabled for at least a first beam for a first resource set and a second beam for a second resource set, the control signaling further requesting for the UE to report a first mutual information metric associated with the first beam and the second beam;

monitoring for a first reference signal transmission via the first beam in accordance with a first resource set configuration of the plurality of resource set configurations;

monitoring for a second reference signal transmission via the second beam in accordance with the first resource set configuration or a second resource set configuration of the plurality of resource set configurations; and transmitting, in accordance with the at least one reporting configuration, a measurement report indicating the first mutual information metric, the first mutual information metric based at least in part on at least one of a measurement associated with the first reference signal transmission or a measurement associated with the second reference signal transmission.

* * * * *